(12) United States Patent
Sterling et al.

(10) Patent No.: US 10,131,473 B2
(45) Date of Patent: Nov. 20, 2018

(54) INVERTED BOTTLE DISPENSING SYSTEMS AND METHODS

(71) Applicant: Henkel IP & Holding GmbH, Düsseldorf (DE)

(72) Inventors: Daniel Peter Sterling, Fairfield, CT (US); Anne E. Nixon, Fairfield, CT (US); Whitney Talbot, Elkton, VA (US); Glenn William Kaye, Stamford, CT (US); Keith Colacioppo, Harrison, NY (US); Christopher Crosby Turek, Stamford, CT (US); Carson E. Ahlman, New York, NY (US); Shannon A. Murphy, Chicago, IL (US); Adam Warren, Newton, CT (US); Michael Daoust, Sandy Hook, CT (US)

(73) Assignee: Henkel IP & Holding GmbH (DE)

( * ) Notice: Subject to any disclaimer, the term of this patent is extended or adjusted under 35 U.S.C. 154(b) by 799 days.

(21) Appl. No.: 14/629,283

(22) Filed: Feb. 23, 2015

(65) Prior Publication Data
US 2016/0244222 A1    Aug. 25, 2016

(51) Int. Cl.
| | | |
|---|---|---|
| B65D 1/32 | (2006.01) |
| B65D 47/20 | (2006.01) |
| B65D 47/32 | (2006.01) |
| B65D 51/24 | (2006.01) |
| B65D 41/26 | (2006.01) |
| B65D 47/12 | (2006.01) |

(52) U.S. Cl.
CPC .......... *B65D 47/2031* (2013.01); *B65D 1/32* (2013.01); *B65D 41/26* (2013.01); *B65D 47/122* (2013.01); *B65D 47/32* (2013.01); *B65D 51/249* (2013.01)

(58) Field of Classification Search
CPC ... B67D 41/26; B65D 51/249; B65D 47/2031
USPC .......................................... 215/311; 222/158
See application file for complete search history.

(56) References Cited

U.S. PATENT DOCUMENTS

| | | | |
|---|---|---|---|
| 1,242,654 A | 10/1917 | Chapman | |
| 2,076,826 A * | 4/1937 | Reinsberg | B65D 51/249 |
| | | | 220/212 |
| 2,143,661 A | 1/1939 | Schrader | |
| 3,128,919 A | 4/1964 | Baxter | |
| 4,607,762 A | 8/1986 | Zulauf et al. | |

(Continued)

FOREIGN PATENT DOCUMENTS

WO    2005/049477 A2    6/2005

OTHER PUBLICATIONS

Written Opinion of the International Searching Authority and International Search Report for International Appl. No. PCT/US16/19179, dated May 2, 2016, 14 pages.

*Primary Examiner* — Anthony Stashick
*Assistant Examiner* — Raven Collins
(74) *Attorney, Agent, or Firm* — Bojuan Deng

(57) ABSTRACT

A dispensing system that includes a bottle, a valve cap, a dosing cap. The bottle includes a side wall having at least a portion that is flexible. The valve cap regulates the dispensing of a flowable product from bottle into the dosing cap. In particular, flowable product may be dispensed from the bottle into the dosing cap when the dispensing system is in an inverted position and while the dosing cap is attached to valve cap. The valve cap and the dosing cap may support the dispensing system in the inverted position.

20 Claims, 19 Drawing Sheets

(56) References Cited

U.S. PATENT DOCUMENTS

| | | |
|---|---|---|
| 4,728,006 A | 3/1988 | Drobish et al. |
| 4,749,108 A | 6/1988 | Dornsbusch et al. |
| 4,875,603 A | 10/1989 | Weinstein |
| 4,969,581 A | 11/1990 | Seifert et al. |
| 5,127,553 A | 7/1992 | Weinstein |
| 5,186,367 A | 2/1993 | Hickerson |
| 5,224,632 A | 7/1993 | Murakami et al. |
| 5,271,531 A | 12/1993 | Rohr et al. |
| 5,339,995 A | 8/1994 | Brown et al. |
| 5,358,152 A | 10/1994 | Banks |
| 5,390,805 A | 2/1995 | Bilani et al. |
| 5,549,224 A * | 8/1996 | Wu .................. B65D 51/1688 222/158 |
| 5,655,687 A | 8/1997 | Fitten et al. |
| 5,788,108 A | 8/1998 | Rohr |
| 5,884,816 A | 3/1999 | Hinze |
| 5,897,033 A | 4/1999 | Okawa et al. |
| 6,089,419 A | 7/2000 | Gross |
| 6,334,550 B1 | 1/2002 | De Backer |
| 6,523,711 B1 | 2/2003 | Hughes et al. |
| 6,675,845 B2 | 1/2004 | Volpenheim et al. |
| 6,796,343 B2 | 9/2004 | Kelsey et al. |
| 7,874,466 B2 * | 1/2011 | McConville ....... B65D 47/2031 220/203.18 |
| 8,162,186 B2 | 4/2012 | Maxwell |
| 8,528,795 B2 | 9/2013 | Law et al. |
| 2007/0295753 A1 * | 12/2007 | Vangeel ............... A47K 5/1207 222/163 |
| 2008/0029548 A1 | 2/2008 | De Wree et al. |
| 2010/0314347 A1 * | 12/2010 | Haberman ................ A61J 9/04 215/6 |
| 2012/0012550 A1 * | 1/2012 | Boonprasop ............. A61J 11/02 215/11.4 |
| 2012/0080450 A1 * | 4/2012 | Dziersk .................. B65D 47/08 222/173 |
| 2012/0312839 A1 * | 12/2012 | Stehli, Jr. ........... B65D 83/0055 222/184 |
| 2013/0043280 A1 | 2/2013 | Hagleitner |
| 2016/0199262 A1 * | 7/2016 | Itzek ................... A61J 11/0015 215/11.1 |

\* cited by examiner

INVERTED BOTTLE DISPENSING SYSTEMS AND METHODS

BACKGROUND OF THE INVENTION

Field of the Invention

Embodiments of this invention generally relate to systems and methods for dispensing a flowable product. In particular, embodiments relate to systems and methods for dispensing a flowable product from a bottle into a cap in an inverted position.

Background Art

Various designs of bottles and other packages are utilized to hold and dispense fluids for various uses. A variety of such bottles and packages currently exist, and are differentiated both in shape, orientation, and types of closure systems. These bottles may be sealed with screw top lids or flip top mechanisms. And some bottles may be designed to be stored in an inverted position. Additionally, some bottles include a cap that is attached to the top of the bottle. The cap may be used for measuring fluid poured from the bottle.

BRIEF SUMMARY OF THE INVENTION

It is often time desirable to regulate the amount of a product (e.g., a fluid) utilized for a specific use and/or situation. In some instances, a measuring cap may be used to measure out a recommended dose of fluid. For example, it may be desirable to use a particular dose of a laundry care product for a particular load of laundry (e.g., a particular does of a detergent, a fabric softener, a fabric conditioner, a scent additive, a bleach, etc. may be recommended for different amounts and/or types of laundry (e.g., color, fabric). Other fluids, such as, but not limited to, dish detergents, automotive fluids, pharmaceutical products (e.g., a medicine), household and industrial cleaners, degreasers, industrial fluids, and personal care products may have recommended dosages for specific uses and/or situations. In addition to measuring specific doses, it may be desirable for a consumer to have a compact and self-contained dispensing system that allows for dispensing variable amounts of a fluid into a measuring/dosing cap. Additionally, it may be desirable for the dispensing system to be stored in an inverted position such that remaining fluid is always positioned for dispensing. Moreover, it may also be desirable for the dispensing system to dispense a fluid into the measuring cap without the need to disassemble the measuring cap from the dispensing system (i.e., dispense into a measuring cap while the measuring cap remains attached to the dispensing system).

Embodiments of the present invention described herein, or elements thereof, may accomplish one or more of these and other objectives.

Some embodiments are directed towards a dispensing system including a bottle having a proximal end and a distal end separated by a side wall which has a portion that is flexible, the proximal end including an opening. The dispensing system also including a valve cap liquid-tightly attached to the opening of the bottle, the valve cap including a valve in fluid communication with the opening of the bottle, and a dosing cap attached to the valve cap, including a closed end and an open end. The valve cap allowing flowable product to be dispensed from the bottle into the dosing cap when the dosing cap is locked on the valve cap and the bottle is in an inverted position with the opening disposed below the distal end.

Some embodiments are directed towards a dispensing system including a bottle having a proximal end and a distal end separated by a side wall which has a portion that is flexible, the proximal end including an opening. The dispensing system also including a valve cap liquid-tightly attached to the opening of the bottle, a valve in fluid communication with the opening of the bottle, a dosing cap attached to the valve cap, the dosing cap including a closed end and an open end, and a venting aperture formed in the valve cap to allow air flow into and out of the dosing cap.

Some embodiments are directed towards a dispensing attachment for a bottle, the dispensing attachment including a dosing cap having a closed end and an open end, a valve cap attached to the dosing cap and configured to liquid-tightly attach to the opening of a bottle, and a valve assembly disposed on the valve cap. The valve assembly including a valve body including a distal opening and a proximal opening, an outlet valve disposed at the proximal opening of the valve body, and a shut-off valve disposed in the valve body and movable between an open position and a closed position, the shut-off valve being configured to open the distal opening of the valve body when the dispensing attachment is in an inverted position with the proximal opening disposed below the distal opening and to close the distal opening of the valve body when the dispensing attachment is in an upright position with the proximal opening disposed above the distal opening.

BRIEF DESCRIPTION OF THE DRAWINGS/FIGURES

DETAILED DESCRIPTION OF THE INVENTION

Figure 1:
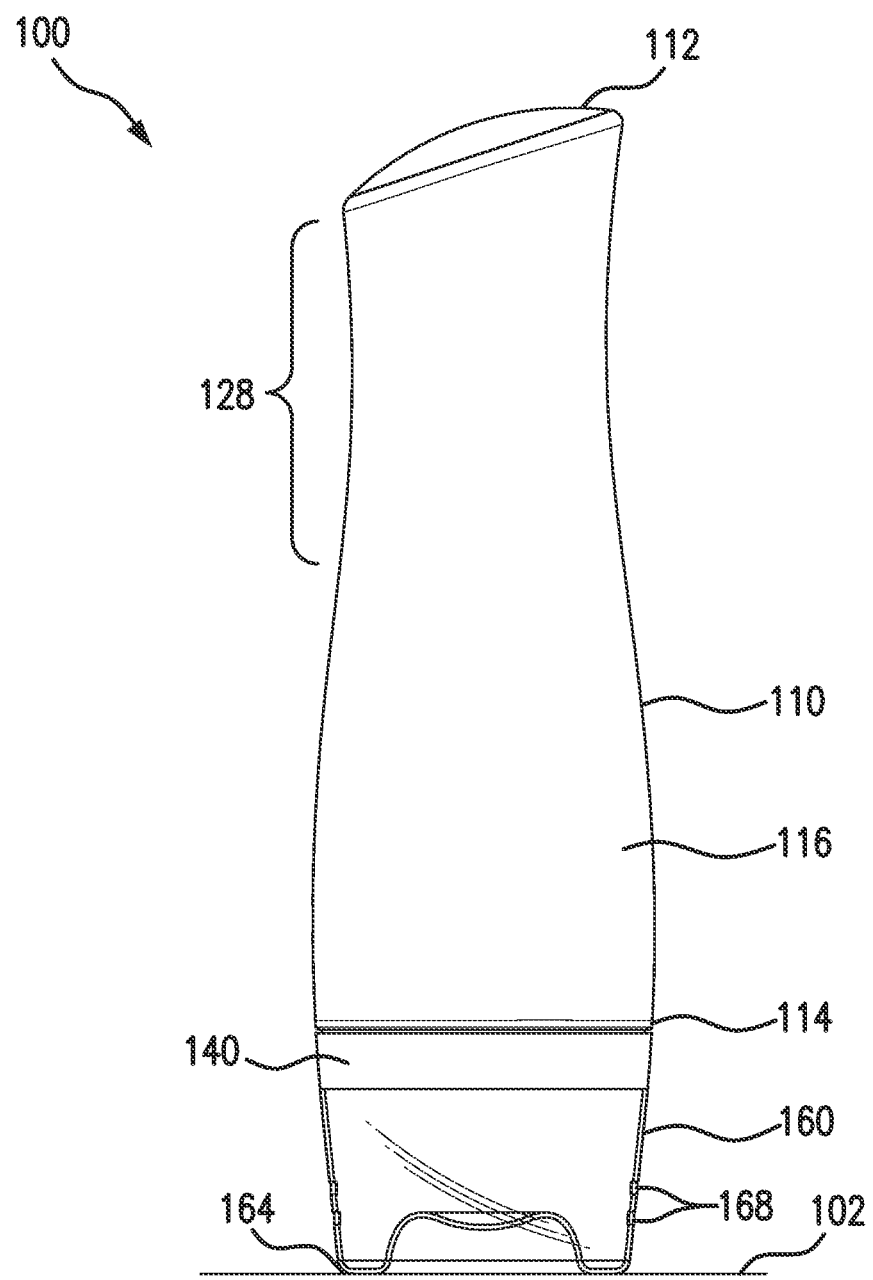
FIG. 1 shows a dispensing system according to an embodiment.

The present invention will now be described in detail with reference to embodiments thereof as illustrated in the accompanying drawings, in which like reference numerals are used to indicate identical or functionally similar elements. References to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is within the knowledge of one skilled in the art to affect such feature, structure, or characteristic in connection with other embodiments whether or not explicitly described.

The following examples are illustrative, but not limiting, of the present invention. Other suitable modifications and adaptations of the variety of conditions and parameters normally encountered in the field, and which would be apparent to those skilled in the art, are within the spirit and scope of the invention.

The use of a recommended amount of product (e.g., fluid) is often times desirable for a specific need and/or situation. For example, a specific dose of a laundry care product (e.g., a detergent, a fabric softener, a fabric conditioner, a scent additive, a bleach, etc.) may be recommended for a specific load of laundry (e.g., specific amounts, colors, and/or fabrics in the load). Exceeding the recommended dosage may be unnecessary in some instances and wasteful. Moreover, in some instances, exceeding the recommended dosage can be harmful. For example, an excess amount of bleach may undesirably remove color from an article of clothing. As such, encouraging the use of a recommended dosage is of interest.

A compact and aesthetically pleasing dispensing system that allows for dispensing variable amounts of a product into a measuring/dosing cap may encourage the use of a recommended dosage. Moreover, a dispensing system that is capable of dispensing a product into the measuring cap without the need to disassemble the measuring cap from the dispensing system before dispensing (i.e., dispensing into a measuring cap while the measuring cap remains attached to the dispensing system) may encourage the use of a recommended dosage. Also, removing the need to disassemble the measuring cap may reduce the chance of spilling product when measuring out a recommended dose.

It may also be desirable for a dispensing system to dispense a constant stream of product (i.e. dispense product in a stream having constant volume and/or rate). A constant and repeatable stream may provide for a consistent dispensing experience for a user. Constant and repeatable dispensing facilitates freedom to use a measuring/dosing cap or to dispense directly into a desired area (e.g., in a detergent reservoir in a laundry machine) with predictability and reliability of the amount dispensed, which may also facilitate the use of a recommended dosage.

Additionally, it may be desirable for the dispensing system to be stored in an inverted position such that flowable product remaining within dispensing system is always positioned for dispensing. A dispensing system that can effectively stored in an inverted position should prevent leakage of product and prevent unintentional discharge of product when rotated to an upright position.

FIGS. 1-4B show a dispensing system 100 according to an embodiment of the present invention. Dispensing system 100 includes a container (e.g., a bottle 110), a valve cap 140, and a dosing cap 160. Together, valve cap 140 and dosing cap 160 may form a dispensing attachment for bottle 110. Valve cap 140 regulates the dispensing of a flowable product from bottle 110 into dosing cap 160. In particular, flowable product may be dispensed from bottle 110 into dosing cap 160 via valve cap 140 when dispensing system 100 is in an inverted position (i.e., when bottle 110 is in an inverted position), as shown in FIG. 1. Additionally, dispensing system 100 may dispense a flowable product into dosing cap 160 while dosing cap 160 is attached to valve cap 140. In some embodiments, flowable product may be dispensed from bottle 110 when dosing cap 160 is attached to and locked on valve cap 140. While dispensing into dosing cap 160 is specifically discussed herein, flowable product can also be dispensed from valve cap 140 directly to a desired location (e.g., in a detergent reservoir in a laundry machine). Additionally, flowable product can be dispensed into dosing cap 160 when dosing cap 160 is detached from valve cap 140.

Bottle 110 has a distal end 112, a proximal end 114, and a side wall 116 extending between distal end 112 and proximal end 114. Distal end 112, proximal end 114, and side wall 116 define an interior volume 117 (see e.g., FIG. 3A) for holding a flowable product. Flowable product may be, for example, a fluid, a gel, a powder, or a granulated product. In particular, the flowable product may be, but is not limited to, a laundry care product (e.g., a detergent, a fabric softener, a fabric conditioner, a scent additive, a bleach, etc.), a dish detergent, an automotive fluid, a household or industrial cleaner, a degreaser, an industrial fluid, a pharmaceutical compound (e.g., a medicine), a personal care product (e.g., a mouthwash), or a food product (e.g., a condiment).

In some embodiments, bottle 110 may include a gripping portion 128 to increase the ease in which a user can grasp and squeeze bottle 110. In some embodiments, gripping portion 128 may include a concave curvature located between distal end 112 and proximal end 114 so as to improve grip and squeezability. In some embodiments, gripping portion 128 may have a reduced circumference compared the rest of side wall 116.

At least a portion of side wall 116 includes a portion that is sufficiently flexible (i.e., composed of a flexible material) to allow a user to squeeze bottle 110 and dispense a flowable product. In some embodiments, entire side wall 116 may be composed of a flexible material. In some embodiments, entire bottle 110 is composed of a flexible material. While the container of dispensing system 100 is discussed herein as a bottle, other squeezable containers for dispensing flowable product may be used including, but not limited to, pouches (e.g., stand-up pouches) or deformable tubes (e.g., similar to a toothpaste tube).

The flexible material of side wall 116, or a portion thereof, should deform when a user squeezes bottle 110. In some embodiments, side wall 116 has enough structural rigidly to support the weight of bottle 110 and a flowable product contained therein. Moreover, in some embodiments, side wall 116 may retain its shape unless a significant force is applied to bottle 110 (e.g., force imparted by a user squeezing bottle 110). In other words, the flexible material of side wall 116 may have enough structural rigidity such that merely grasping bottle 110 does not cause a deformation of side wall 116 and/or a decrease of internal volume 117. In some embodiments, side wall 116 may not retain its shape and may not provide enough structural rigidly to support its own weight and a flowable product contained therein (e.g., if the container of dispensing system in a flexible pouch).

When side wall 116 is squeezed with a sufficient amount of force, side wall 116 will deform. This deformation decreases the internal volume 117 of bottle 110 thereby forcing flowable product contained therein out of bottle 110. Preferably, side wall 116, or a portion thereof, should be flexible enough so as to allow a user to deform side wall 116 with relative ease. In some embodiments, side wall 116, or a portion thereof, is flexible enough to allow a user to increase the pressure within bottle 110 such that a valve on valve cap 140 can be actuated with relative ease. In some embodiments, side wall 116, or a portion thereof, is flexible enough to allow a user to increase the pressure within bottle by at least 0.83 psi+/−0.18 psi (23 in.$H_2O$+/−5 in.$H_2O$) with relative ease.

In some embodiments, side wall 116, or a portion thereof, will at least partially return to its approximate original shape and/or volume after removal of the force imparted by a user squeezing bottle 110. In some embodiments, side wall 116, or a portion thereof, will fully return to its original shape and/or volume after removal of the force imparted by a user squeezing bottle 110. A bottle 110 that returns to its original shape, either partially or fully, may be aesthetically pleasing for a user. Moreover, it may increase a user's confidence in the robustness of bottle 110.

Side wall 116, or a portion thereof, may be composed of one or more flexible materials including polymeric materials, such as, but not limited to, polypropylene (PP), polyethylene (PE), high-density polyethylene (HDPE), polyamides (PA) polyethylene terephthalate (PET), polyvinylchloride (PVC). In some embodiments, side wall 116, or a portion thereof, may be composed a flexible metallic material, such as aluminum. It should be appreciated that the thickness of side wall 116, or a portion of thereof, may dictate the flexibility of side wall 116. In some embodiments, side wall 116 may be composed of a single material that is sufficiently flexible to allow a user to deform side wall 116 with relative ease. In some embodiments, side wall 116 may be composed of a plurality of materials, where at least one of the materials is sufficiently flexible to allow a user to deform side wall 116 with relative ease. Distal end 112 and proximal end 114 of bottle 110 may be composed of the same material as side wall 116 or may be composed of different materials.

Side wall 116 and bottle 110 may be transparent, translucent, or opaque. In some embodiments, side wall 116 may be partially opaque and partially transparent and/or translucent. In such embodiments, the transparent and/or translucent portion of side wall 116 may provide a visual indicator showing the amount of flowable product remaining within bottle 110. Bottle 110 may have any shape or size configured to hold any amount of product. As a non-limiting example, bottle 110 may hold between approximately 50 mL and approximately 2000 mL of product. As another non-limiting example, bottle 110 may have a height in the range of 6 inches to 12 inches. The size, shape, and interior volume 117 of bottle 110 may depended on the type of flowable product contained within bottle.

Distal end 112 of bottle 110 may be closed while proximal end 114 of bottle 110 may include an opening 122 that allows a flowable product to be dispensed from bottle 110. Proximal end 114 may include a neck 120 that forms opening 122. In some embodiments, proximal end 114 may include a shoulder 118 connecting side wall 116 to neck 120. In some embodiments, shoulder 118 may include an alignment feature 119 for engaging a corresponding alignment feature on valve cap 140. In some embodiments, shoulder 118 may include a shoulder recess 126 for facilitating air flow between valve cap 140 and shoulder 118 (as described below in reference to FIG. 3B). Shoulder recess 126 may also serve to relax manufacturing tolerances for bottle 110 and/or valve cap 140.

Figure 2:
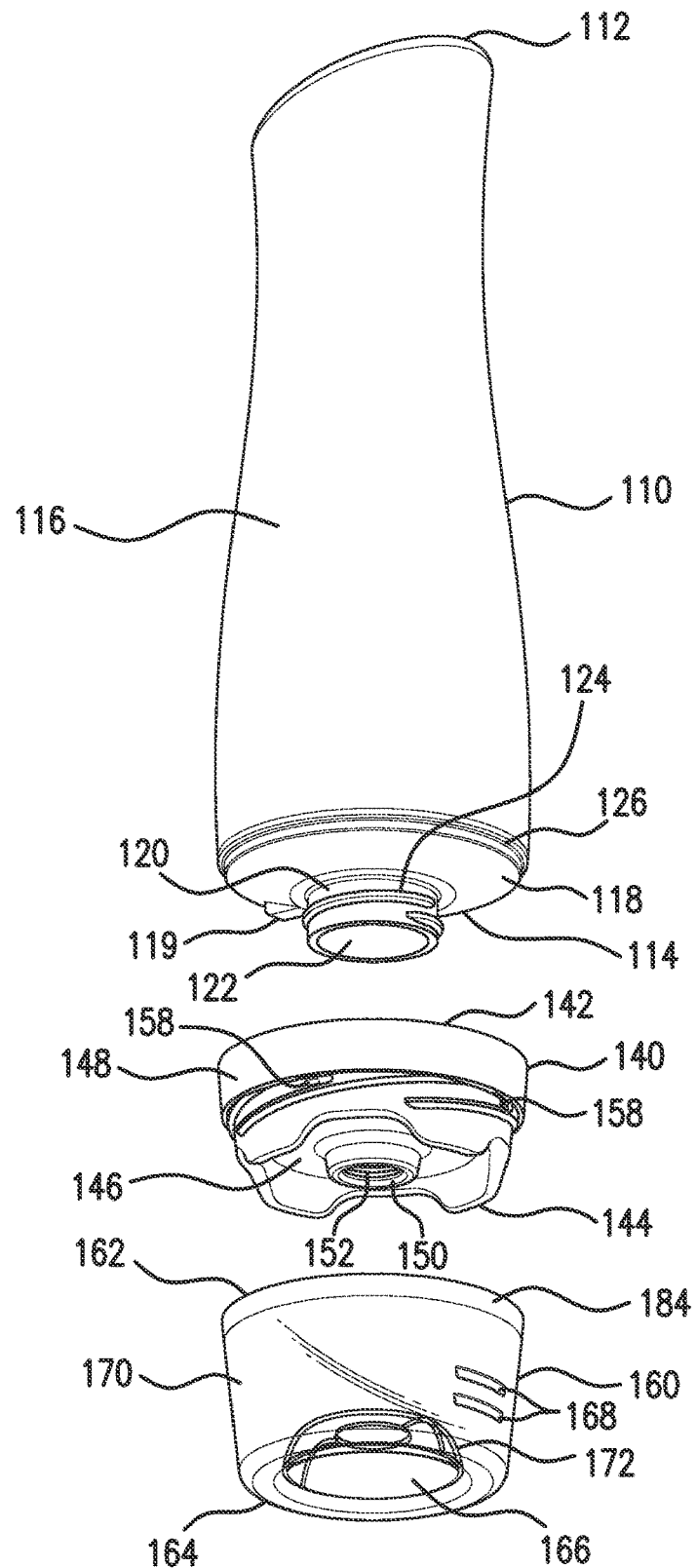
FIG. 2 shows an exploded perspective of a dispensing system according to an embodiment.

As shown, for example in FIG. 2, valve cap 140 includes a distal end 142 and a proximal end 144. Valve cap 140 may include a valve cap body 146 and a valve cap skirt 148 disposed radially about valve cap body 146. Valve cap body 146 includes a dispending outlet 150 for dispensing a flowable product contained within bottle 110. A valve 152 in communication with dispensing outlet 150 may regulate the flow of product from bottle 110 through dispensing outlet 150. When valve cap 140 is attached to bottle 110, valve 152 is in fluid communication with opening 122 of bottle 110 and resealably closes opening 122 of bottle 110. In some embodiments, valve 152 may be in direct fluid communication with opening 122 of bottle 110. In some embodiments, valve 152 may be directly attached to opening 122 of bottle 110 and valve cap 140 may be configured to receive and position valve 152 in communication with dispensing outlet 150.

Valve 152 may allow a variable amount of flowable product to be dispensed from dispensing outlet 150. In some embodiments, valve 152 may be a non-mechanical valve including a flexible material that opens and closes one or more resealable apertures formed in valve 152 when pressure is applied to/removed from bottle 110 (i.e., when bottle 110 is squeezed and released by a user). Valve 152 prevents dispensing of flowable product from opening 122 when bottle 110 in an inverted position and not being squeezed by a user (i.e., prevents the flowable product from leaking due to the effects of gravity). Valve 152 also prevents discharge of flowable product from dispensing outlet 150 due to an impact force imparted on flowable product when a user sets bottle 110 on a surface 102. In some embodiments, valve 152 may be a slit valve including a polymeric membrane having one or more slits formed therein, such as, for example valve 560 or valve 600 described herein. The slits in the polymeric membrane may deform and open when pressure is applied to bottle 110 and close when the pressure is removed. The polymeric membrane of valve 152, and other parts of valve 152, may be composed of a polymeric material such as, but not limited to, natural rubber, synthetic rubber, silicone, silicone rubber, a thermoplastic elastomer, a thermoplastic vulcanizate, and combinations thereof. In some embodiments, valve 152 may be a V21-200, a V1-220, or a V1-187 valve manufactured by Aptargroup, Inc. In some embodiments, valve 152 may be secured to valve cap 140 using a retainer (e.g., a retainer ring) and retainer may be secured to valve cap 140 using, for example, a snap fit, an adhesive, a friction fit, or a heat weld.

Valve cap 140 attaches to proximal end 114 of bottle 110. In some embodiments, valve cap skirt 148 may be sized and shaped to receive at least a portion of shoulder 118 when valve cap 140 is attached to bottle 110. In some embodiments, valve cap 140 may liquid-tightly attach to neck 120. In some embodiments, a connector 154 attached to valve cap body 146 may liquid-tightly attach to neck 120. Connector 154 may include an attachment mechanism 156 that liquid-tightly attaches to a corresponding attachment mechanism 124 on neck 120. In some embodiments, an open end 155 of connector 154 may be sized and shaped (dimensioned) to receive at least a portion of neck 120. Alternatively, opening 122 in neck 120 may receive at least a portion of connector 154. Attachment mechanisms 124 and 156 may be any suitable releasable attachment mechanisms such as, but not limited to, threaded connectors, luer-lock connectors, friction fit connectors, snap-fit connectors, or a combination thereof. In some embodiments, neck 120 and connector 154 may alternatively or additionally be permanently attached using, for example, an adhesive.

Valve cap 140 may also include one or more venting apertures 158 formed in either valve cap body 146 and/or valve cap skirt 148. Venting apertures 158 allow air to flow into and out of dosing cap 160 when dosing cap 160 is attached to valve cap 140. When a flowable product is dispensed into dosing cap 160 attached to valve cap 140, venting apertures 158 allow air to flow out of dosing cap 160. This air flow increases the ease of filling dosing cap 160 with flowable product when bottle 110 is squeezed by alleviating pressure build up within dosing cap 160. Alleviating pressure build up also prevents dosing cap 160 from being forced off valve cap 140 during dispensing. Additionally, the flow of air though venting apertures 158 allows air to flow into dosing cap 160 and into dispensing outlet 150 after flowable product is dispensed. This air flow into dosing cap 160 and dispensing outlet 150 prevents vacuum build up within bottle 110 and/or dosing cap 160, thereby allowing the bottle 110 to return, fully or at least partially, to its original shape after dispensing while dosing cap 160 is attached to valve cap 140. The air flow facilitated by venting apertures 158 is described in greater detail below with reference to FIG. 3B.

Valve cap 140 may be or may include any of the features (as long as the features are not mutually exclusive) of valve caps 200, 300, 400, and 500 described herein. In some embodiments, valve cap body 146 and valve cap skirt 148 may be a single integrally formed piece (e.g., using injection molding and/or machining). In some embodiments, valve cap body 146 and valve cap skirt 148 may be separate pieces connected using, for example, a heat weld. Valve cap 140 may be composed of any suitable material including a polymeric material, such as, but not limited to, polypropylene (PP), polyethylene (PE), high density polyethylene (HDPE), polycarbonate (PC), polyamides (PA) polyethylene terephthalate (PET), polyvinylchloride (PVC), polystyrene (PS), and combinations thereof.

Dosing cap 160 may attach to valve cap 140 and includes an open end 162 and a closed end 164. Open end 162 of dosing cap 160 may be sized and shaped to receive at least a portion of valve cap 140 when attached to valve cap 140. Dosing cap 160 also includes an outer circumferential wall 170 connected to a base wall 165 and extending between open end 162 and closed end 164. Open end 162, base wall 165, and outer circumferential wall 170 form a chamber 171 for receiving a flowable product dispensed from bottle 110. In some embodiments, outer circumferential wall may define a coupling 184 that attaches to a coupling on a valve cap (e.g., coupling 260 on valve cap 200). In some embodiments, coupling 184 may be configured to release from valve cap 140 before valve cap 140 detaches from bottle 110, preventing accidental removal of valve cap during use.

Base wall 165 may be configured to support dispensing system 100 in an inverted position on surface 102 (see e.g., FIG. 1). Base wall 165 may have any shape capable of supporting dispensing system 100 in an inverted position. The size and shape of base wall 165 may be chosen based on the size and shape of bottle 110. A base wall 165 configured to support dispensing system 100 in an inverted position encourages storage in an inverted position, which may aid in efficiently dispensing flowable product from bottle 110 because flowable product will collect at proximal end 104 of bottle 110 due to gravity. In some embodiments, dosing cap 160 may attach to bottle 110.

Chamber 171 of dosing cap 160 may have any suitable volume. As a non-limiting example, chamber 171 may hold between about 10 mL and about 250 mL of a flowable product. The volume of chamber 171 may depend on the type of flowable product contained within bottle 110 and/or the typical recommended doses for a flowable product. After a flowable product is dispensed into dosing cap 160, it may be poured from dosing cap 160 via open end 162. In some embodiments, the walls of dosing cap 160 (e.g., outer circumferential wall 170, inner circumferential wall 172, and/or elevated wall 174) may have continuous curvature (i.e., no corners) so as to minimize splashing of flowable product dispensed into dosing cap 160 and to prevent the accumulation of residue within dosing cap 160.

In some embodiments, dosing cap 160 may include dose indicators 168 for indicating specific volume amounts within dosing cap 160 (i.e., specific doses of flowable product). Dose indicators 168 may be, but are not limited, projections or depressions formed on outer circumferential wall 170 (e.g., molded with dosing cap 160) or colored lines formed on outer circumferential wall 170. In some embodiments, dose indicators 168 may be formed on an outer surface 180 of outer circumferential wall 170 to reduce residue accumulation within the dosing cap 160. In some embodiments, dose indicators 168 may be formed on an inner surface 182 of circumferential wall 170 and protrude into chamber 171 so as to create a smooth outer surface 180 that facilities the attachment of a label (e.g., label 720). Dose indicators 168 may be any size or shape. Preferably, dose indicators 168 are large enough so as not to be obfuscated by product dispensed into dosing cap 160.

Dosing cap 160 may be composed of any suitable material including a polymeric material such as, but not limited to, polypropylene (PP), polyethylene (PE), high density polyethylene (HDPE), polycarbonate (PC), polyamides (PA) polyethylene terephthalate (PET), polyvinylchloride (PVC), polystyrene (PS), and combinations thereof. The material of dosing cap 160 may be transparent, translucent, or opaque. A transparent or translucent dosing cap 160 allows a user to see the amount of flowable product held within chamber 171 of dosing cap 160. The material of dosing cap 160 may be any color. In some embodiments including a transparent or translucent dosing cap 160, the color of dosing cap 160 may match the color of the flowable product contained within bottle 110. A color match between dosing cap 160 and the flowable material may reduce the visibility of any flowable product residue remaining within chamber 171 after the flowable product is poured from dosing cap 160. Such a color match may provide a more aesthetically pleasing dispensing system 100 that exudes cleanliness.

In some embodiments, the material of dosing cap 160 may be a hydrophobic material or may include an anti-stick agent or a hydrophobic additive to prevent the accumulation of residue within chamber 171. In some embodiments, the interior surface of chamber 171 may be coated within a hydrophobic coating and/or have surface texturing to prevent the accumulation of residue.

In some embodiments, dosing cap 160 may include an inner circumferential wall 172 connected to base wall 165 and spaced apart from outer circumferential wall 170 within chamber 171. An elevated wall 174 located between base wall 165 and open end 162 of dosing cap 160 may be connected to inner circumferential wall 172. Together, inner circumferential wall 172 and elevated wall 174 may define a cavity 166 located at closed end 164 of dosing cap 160. Cavity 166 serves to reduce the cross-sectional volume of dosing cap 160 adjacent to closed end 164. This allows for greater visual differentiation between graduated amounts of flowable product held within chamber 171 of dosing cap 160. In embodiments including dose indicators 168, a greater differentiation between graduated amounts of flowable product allows dose indicators 168 to be separated by a larger distance, thereby making it easier for a user to accurately measure out different dosages and/or volumes of flowable product.

In some embodiments, elevated wall 174 may include an elevated surface 176 having a concave shape. In other words, elevated wall 174 may include an elevated surface 176 that forms a depression 178. In such embodiments, depression 178 may extend into cavity 166. Depression 178 may be positioned below dispensing outlet 150 of valve cap 140 when dosing cap 160 is attached to valve cap 140. In some embodiments, an apex 179 of depression 178 (i.e., the portion of depression 178 that extends furthest into cavity 166) may be positioned directly below the flow path of a flowable product being dispensed from dispensing outlet 150 when dosing cap 160 is attached to valve cap 140. Depression 178 may facilitate an even flow of product around inner circumferential wall 172 when product is dispensed into dosing cap 160, thereby reducing splashing and residue build up.

Figure 3A:
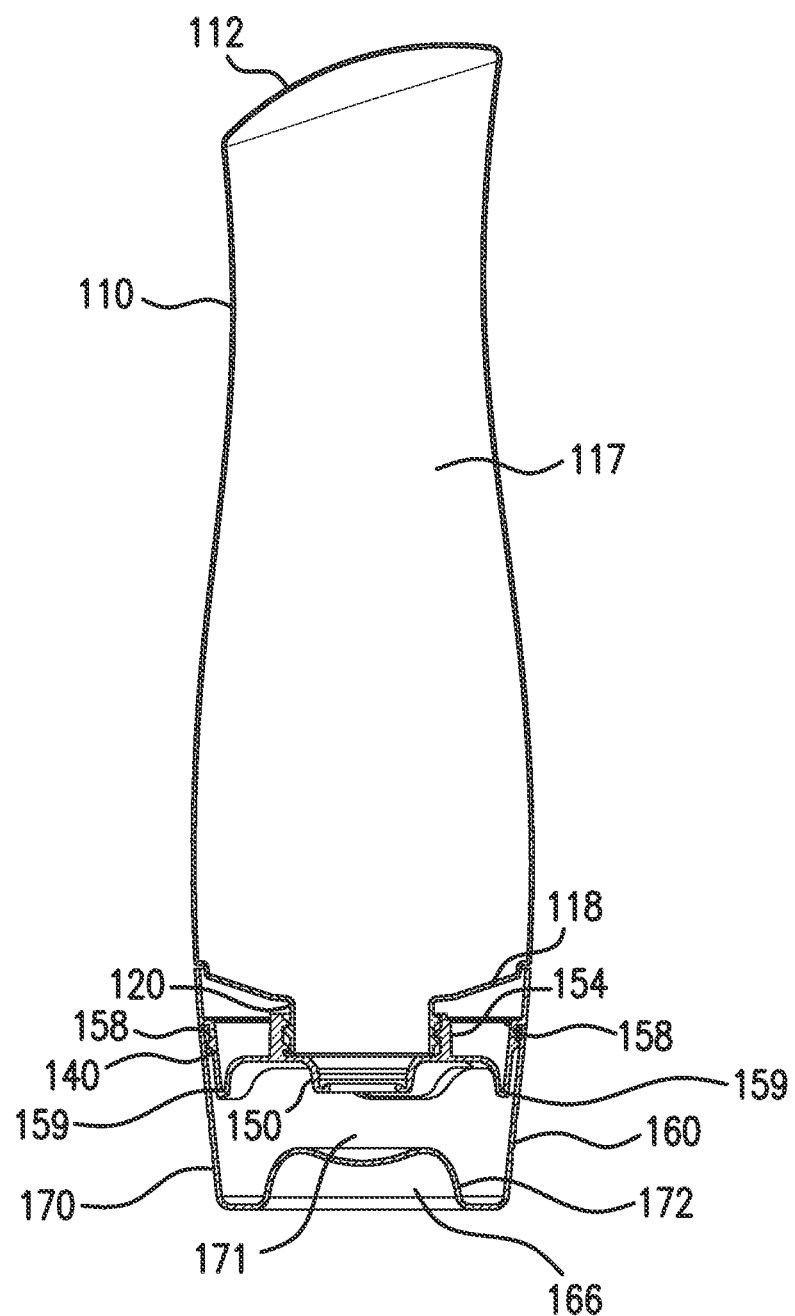
FIG. 3A shows a cross-sectional view of the dispensing system in FIG. 1.
Figure 3B:
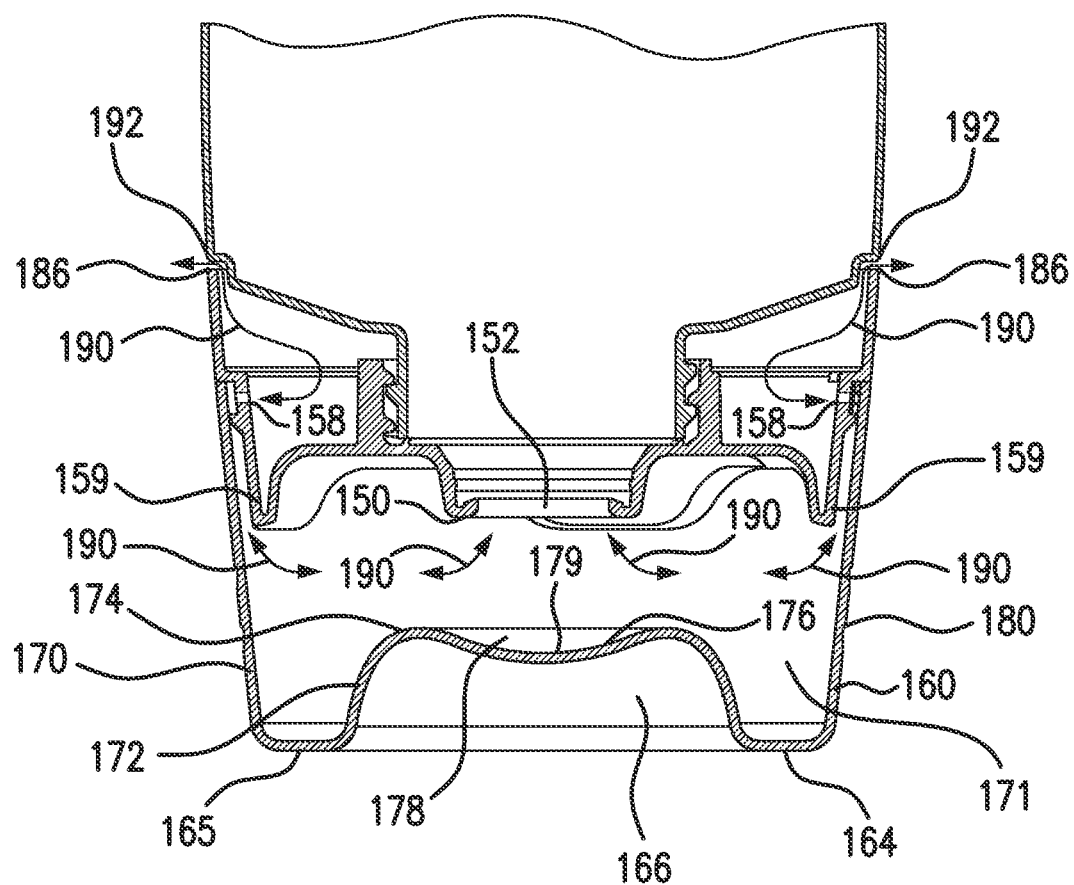
FIG. 3B shows an enlarged view of a portion of FIG. 3A.
Figure 4A:
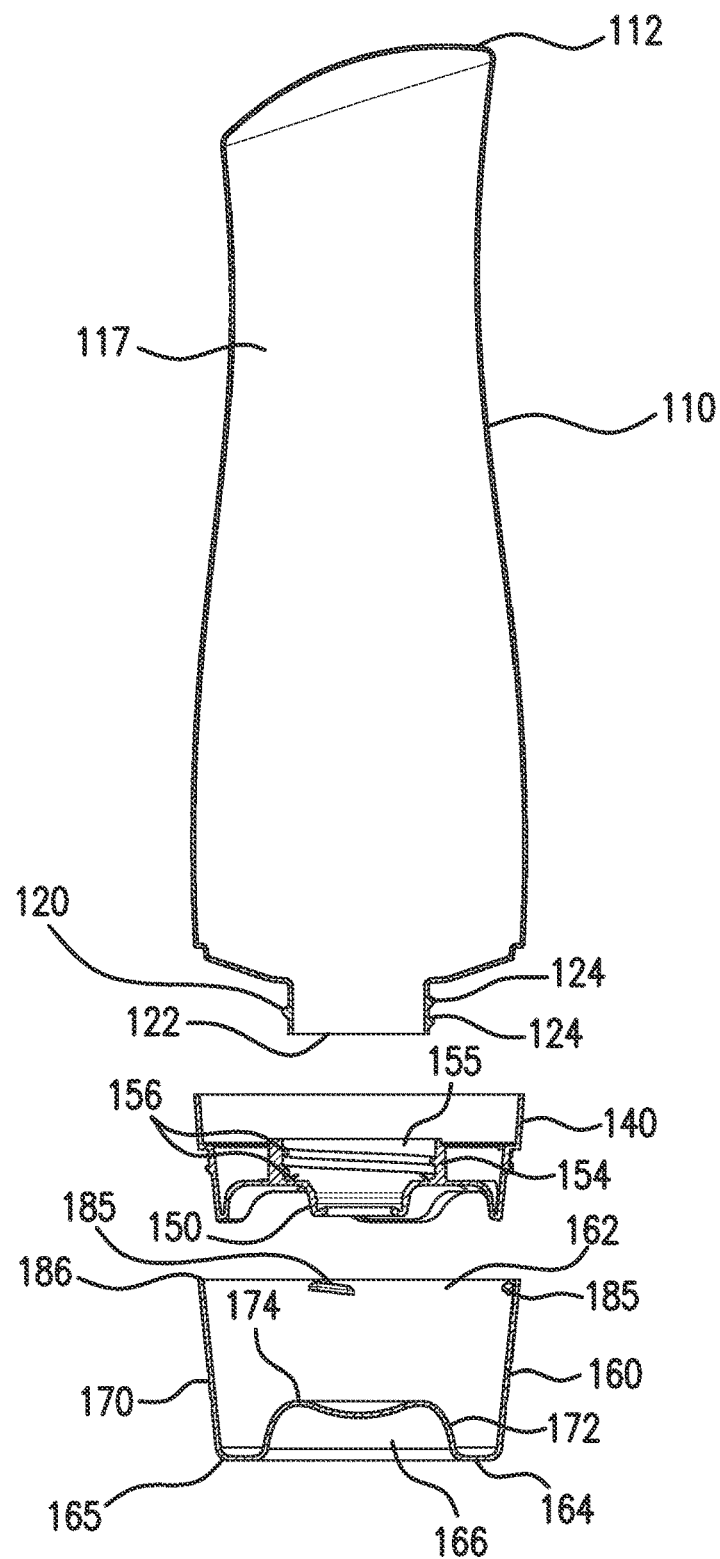
FIG. 4A shows a cross-sectional view of the dispensing system in FIG. 2.
Figure 4B:
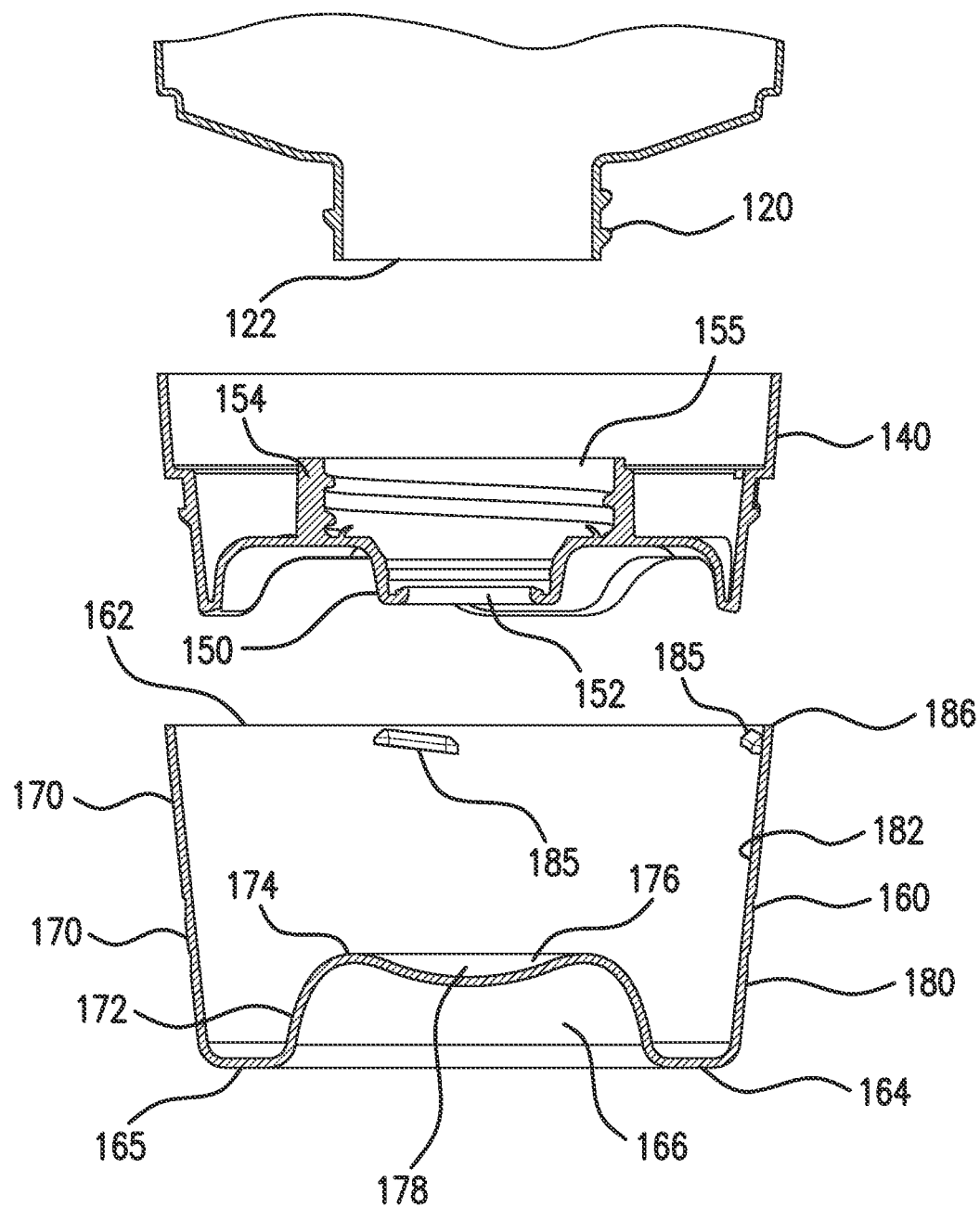
FIG. 4B shows an enlarged view of a portion of FIG. 4A.

As illustrated, for example, in FIGS. 3B and 4B, dosing cap 160 may be removably attached to valve cap 140. In other words, dosing cap 160 may be attached, detached, and re-attached to valve cap 140. Dosing cap 160 may be attached to valve cap 140 via any suitable removable attachment mechanism, such as, but not limited to, a threaded attachment, a snap-fit attachment, a luer-lock type attachment, a friction fit, or combinations thereof. When dosing cap 160 is fully attached to valve cap 140 (e.g., fully screwed onto valve cap 140 or fully snapped into place on valve cap 140) it is locked on valve cap 140.

The air flow 190 created by venting aperture(s) 158, as shown for example, in FIG. 3B, allows flowable product to be dispensed from bottle 110 when dosing cap is locked on valve cap 140. In particular, air flow 190 allows flowable product to be dispensed from bottle 110 when dosing cap 160 is locked on valve cap 140 and when bottle 110 is in an inverted position (see e.g., FIG. 1) with opening 122 disposed below distal end 112 of bottle 110. As shown in FIG. 3B air flows into and out of dosing cap 160 when dosing cap 160 is locked on valve cap 140. When bottle 110 is squeezed by a user, flowable product is dispensed into chamber 171, which in turn displaces the air within chamber 171 and forces it through venting aperture(s) 158. Air displaced from chamber 171 travels through venting aperture(s) 158, through valve cap 140, and exits dispensing system 100 (i.e., enters the environment surrounding dispensing system 100) via a gap 192 located between distal lip 186 of dosing cap 160 and shoulder 118 and/or side wall 116 of bottle 110. In some embodiments, shoulder recess 126 may form at least a part of gap 192. Gap 192 between dosing cap 160 and bottle 110 may be continuous or non-continuous. The flow of air from dosing cap 160 to the environment surrounding dispensing system 100 prevents pressure build up within dosing cap 160 and increases the ease of dispensing product into dosing cap 160.

When bottle 110 is released by a user, air flows into dispensing system 100 via gap 192, through valve cap 140, and into dosing cap 160 via venting aperture(s) 158. After entering dosing cap 160, the air may flow into bottle 110 via dispensing outlet 150. The flow of air into dosing cap 160 and bottle 110 prevents vacuum build up within bottle 110 and/or dosing cap 160, thereby allowing the bottle 110 to return, fully or at least partially, to its original shape after dispensing.

Figure 5:
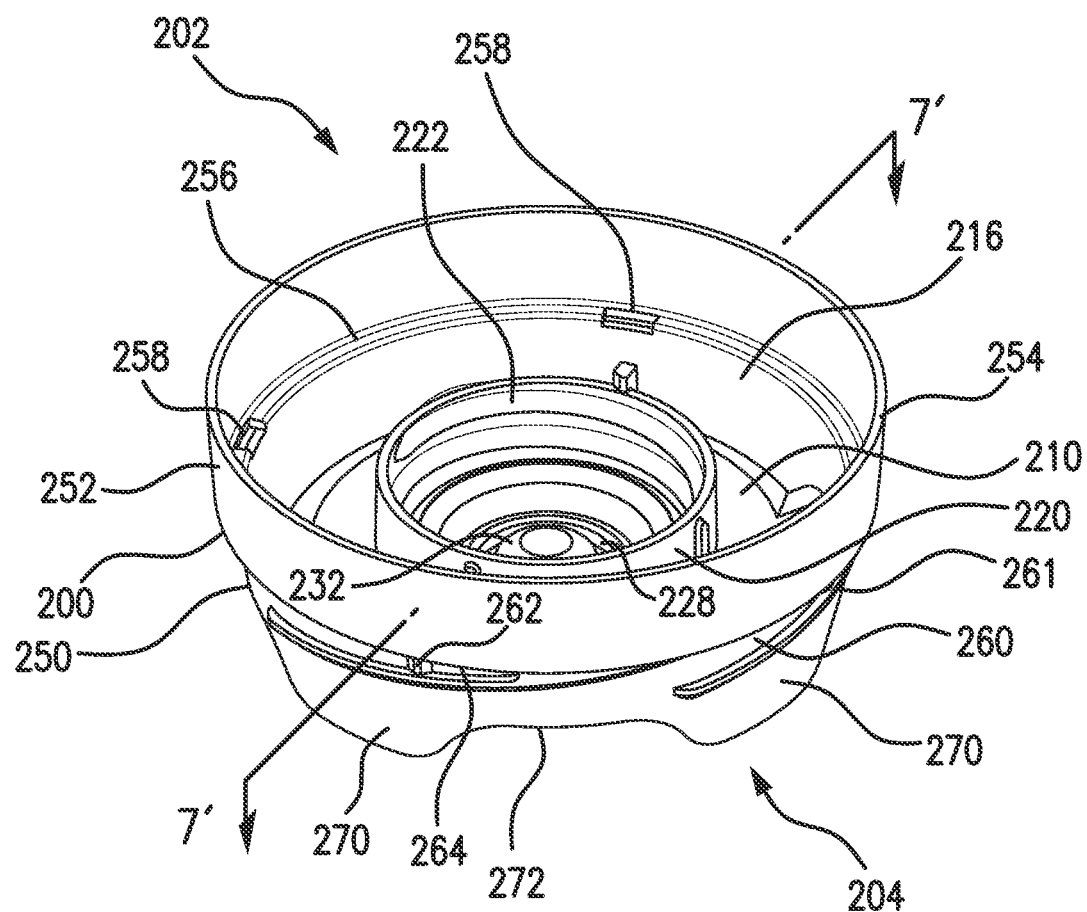
FIG. 5 shows a top perspective view of a valve cap according to an embodiment.
Figure 6:
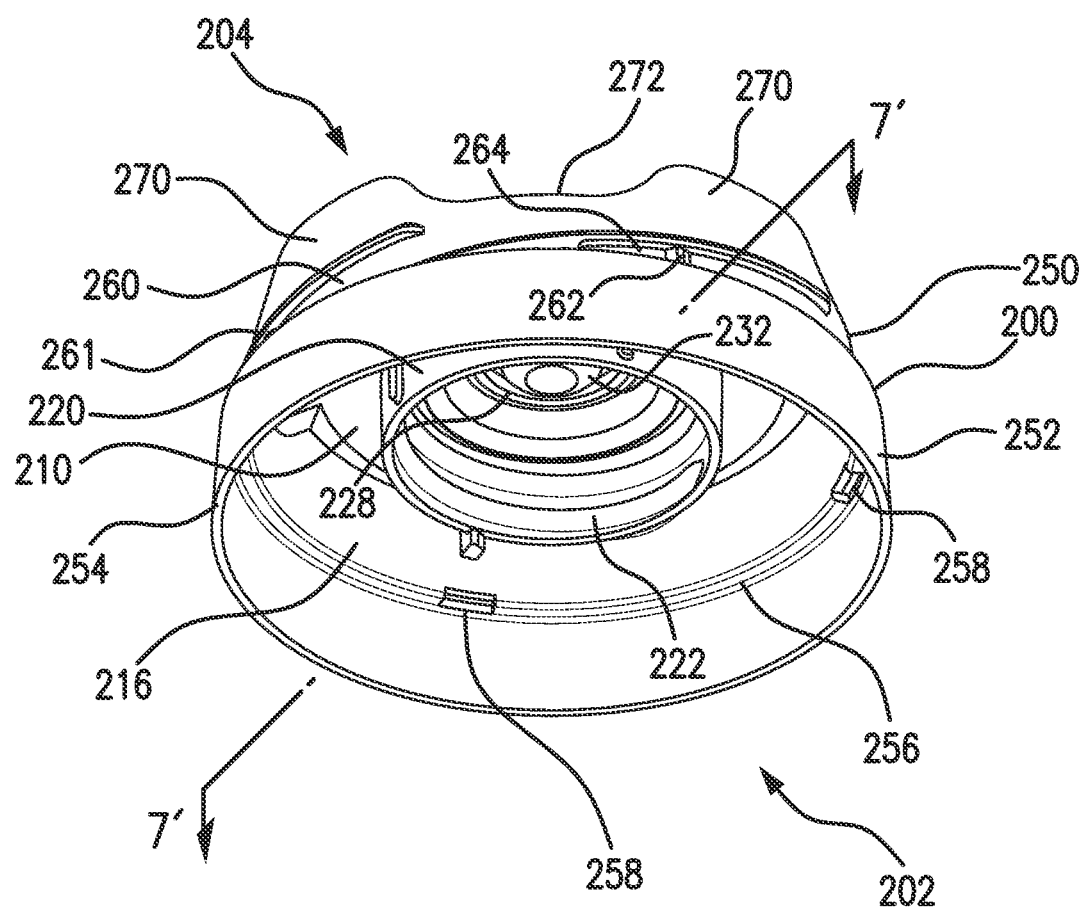
FIG. 6 shows a bottom perspective view of a valve cap according to an embodiment.
Figure 7:
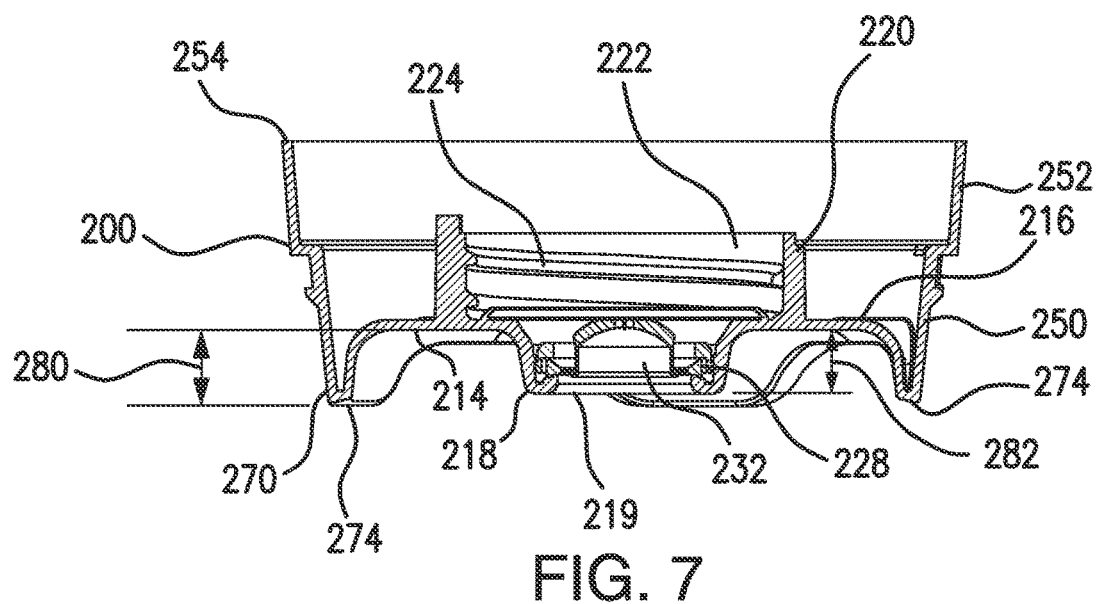
FIG. 7 shows a cross-sectional view of a valve cap according to some embodiments, along the line 7-7' in FIG. 5.

FIGS. 5-7 show a valve cap 200 according to an embodiment. Valve cap 200 includes a distal end 202 and a proximal end 204. Valve cap 200 may include a valve cap body 210 and a valve cap skirt 250. Valve cap body 210 may include a dispending outlet extending from an external surface 214 of valve cap body 210 towards proximal end 204 of valve cap 200. In some embodiments, dispensing outlet 218 may be flush with external surface 214 or recessed below external surface 214 such that dispensing outlet 218 does not extend down into dosing cap 160 when dosing cap 160 is attached to valve cap 200. Dispensing outlet 218 includes a through hole 219 that allows a flowable product contained within bottle 110 to be dispensed via valve cap 200.

In some embodiments, valve cap body 210 and valve cap skirt 250 may be a single integrally formed piece (e.g., using injection molding and/or machining). In some embodiments, valve cap body 210 and valve cap skirt 250 may be separate pieces connected using, for example, a heat weld. Valve cap 200 may be composed of any suitable material including a polymeric material, such as, but not limited to, polypropylene (PP), polyethylene (PE), high density polyethylene (HDPE), polycarbonate (PC), polyamides (PA) polyethylene terephthalate (PET), polyvinylchloride (PVC), polystyrene (PS), and combinations thereof.

Dispensing outlet 218 may include a valve 232 positioned in or adjacent to through hole 219 to regulate the flow of product from bottle 110 through dispensing outlet 218. Valve 232 may be the same as or similar to valve 152 discussed above. In some embodiments, dispensing outlet 218 may include a valve support 228 for securing valve 232 to valve cap 200. In some embodiments, valve support 228 may be integrally formed within dispensing outlet 218. In some embodiments, valve support 228 may be a separate piece, such as retainer 580, 620, or 720 described herein, that is fixed to dispensing outlet 218 (e.g., adjacent to or within through hole 219). In such embodiments, valve support 228 may be fixed to dispensing outlet 218 via, for example, an adhesive, a friction fit, or a heat weld.

Similar to valve cap 140, valve cap 200 attaches to proximal end 114 of bottle 110. In some embodiments, valve cap 200 may liquid-tightly attach to neck 120 via a connector 220. As shown in FIG. 7, connector 220 may be connected to and extend from an internal surface 216 of valve cap body 210 towards distal end 202 of valve cap 200. In some embodiments, connector 220 may be integrally formed with valve cap body 210 (e.g., by injection molding). Connector 220 may include an attachment mechanism 224 that liquid-tightly attaches to corresponding attachment mechanism 124 on neck 120. In some embodiments, an open end 222 of connector 220 may be sized and shaped to receive at least a portion neck 120. Alternatively, opening 122 in neck 120 may receive at least a portion of connector 220. Attachment mechanism 224 may be any suitable releasable attachment mechanism such as, but not limited to, a threaded connector, a luer-lock connector, a friction fit connector, a snap-fit connector, or a combination thereof. In some embodiments, neck 120 and connector 220 may alternatively or additionally be permanently attached using, for example, an adhesive.

Valve cap skirt 250 may be disposed radially about connector 220. A rim 252 of valve cap skirt 250 may include a portion that extends above connector 220 towards open distal end 202 of valve cap 200 such that a distal rim end 254 of rim 252 is disposed above connector 220 when valve cap 200 is in an inverted position (see e.g., FIG. 5). Rim 252 may be sized and shaped to receive at least a portion of shoulder 118 on bottle 110. In some embodiments, distal rim end 254 may form a gap, or at least a portion of a gap, between bottle 110 and valve cap 200 to allow for air flowing into and out of a dosing cap attached to valve cap 200 (see e.g., FIG. 3B). In some embodiments, rim 252 may include a ledge 256 for engaging a distal lip 186 of dosing cap 160. Ledge 256 may serve to properly position dosing cap 160 on valve cap 140. Ledge 256 may also serve as a stop wall that contacts distal lip 186 of dosing cap 160 when dosing cap 160 is fully attached to valve cap 200 (i.e., locked on valve cap 200). In some embodiments, when distal lip 186 of dosing cap 160 contacts ledge 256, dosing cap 160 is locked on valve cap 200.

Valve cap skirt 250 may also define a coupling 260 for removably attaching to coupling 184 disposed on dosing cap 160. Coupling 260 may be formed on an outer surface 251 of valve cap skirt 250. Couplings 260 and 184 may be any suitable releasable attachment mechanisms such as but not limited to, threaded connectors, luer-lock connectors, friction fit connectors, snap-fit connectors, or a combination thereof. In some embodiments, as shown in FIGS. 5-7, coupling 260 may include threads 261, one or more locking tabs 262, and one or more locking recesses 264.

Locking recesses 264 may be sized and shaped to receive a locking projection 185 of coupling 184 (see FIGS. 4A and 4B). In operation, locking projection(s) 185 may lock dosing cap 160 onto valve cap 200 when received within locking recess(es) 264. When all the locking projections 185 of dosing cap 160 are received within locking recesses 264 of valve cap 200, dosing cap 160 is locked on valve cap 200. The placement of coupling 260 having threads 261, locking tab(s) 262 and locking recess(es) 264 on valve cap 200 rather than the dosing cap 160, and the use of locking projections 185 instead of threads on dosing cap 160 may help reduce the accumulation of residue on dosing cap 160. In such an embodiment, residue may not collect and become trapped between threads. Moreover, locking projections 185 provide less surface area for the accumulation of residue, compared to one or more threads radially disposed on dosing cap 160.

Valve cap 200 may also include one or more feet 270. In some embodiments, valve cap body 210 and valve cap skirt 250 may define one or more feet 270. Feet 270 may extend from external surface 214 of valve cap body 210 towards proximal end 204. In other words, feet 270 extend below external surface 214 when valve cap 200 is in an inverted position (see e.g., FIG. 7). When dosing cap 160 is attached to valve cap 200, feet 270 extend from external surface 214 towards closed end 164 of dosing cap 160 (see e.g., feet 159 in FIGS. 3A and 3B). Valve cap 200 may include any number of feet 270 disposed in any configuration. Feet 270 may be radially disposed about dispensing outlet 218. In some embodiments, feet 270 are evenly radially spaced about dispensing outlet 218.

Feet 270 include proximal surfaces 274 disposed at the proximal end of feet 270. In some embodiments, proximal surfaces 274 extend below the most proximal portion of dispensing outlet 218 and, as such, define the most proximal portion of valve cap 200. In other words, the height 280 of feet 270 may be greater than the height 282 of dispensing outlet 218 (both heights being measured from external surface 214 of valve cap 200). In such embodiments, feet 270 serve to support bottle 110 in an inverted position on surface 102 when dosing cap 160 is not attached to valve cap 200. Moreover, feet 270 may help signal to a user that bottle 110, with valve cap 200 attached, may be placed on surface 102 in an inverted position. Spaces 272 separate feet 270 and allow air flow between adjacent feet 270. Spaces 272 also prevent the formation of a vacuum seal forming between valve cap 200 and surface 102 in the event valve cap 200 is placed directly on surface 102, which may be wet or otherwise covered with residue.

Valve cap 200 may also include one or more venting apertures 258 formed in either the valve cap body 210 and/or valve cap skirt 250. As discussed above with reference to venting apertures 158, venting apertures 258 allow for air flow into and out of dosing cap 160 when dosing cap 160 is locked on valve cap 200. Venting apertures 258 may be the same as or similar to venting apertures 158. In some embodiments, as shown in FIGS. 5 and 6, venting apertures 258 may be formed in and/or adjacent to ledge 256 on valve cap skirt 250. In some embodiments, venting apertures 258 may be formed in and/or adjacent to ledge 256 at locations corresponding to the locations of locking recesses 264.

In some embodiments, dispensing system 100 may include a stop valve configured to allow dispensing of a flowable product (e.g., open an opening in a valve cap) when dispensing system 100 is in an inverted position and prevent dispensing of a flowable product (e.g., close an opening in a valve cap) when dispensing system 100 is in an upright position. In some embodiments, the stop valve may be included on a valve cap. The stop valve may function relative to the position of bottle 110. In some embodiments, the stop valve may be a reversibly actuated by turning dispensing system 100 upside-down (inverted portion) and right-side up (upright position). The stop valve may be actuated by, for example, gravity, pressure, buoyancy, or a combination thereof. In some embodiments, the stop valve may include one or more movable parts that open an opening in a valve cap to allow dispensing of product and close an opening in the valve cap to prevent dispensing of product.

FIGS. 8A-10B show a valve cap 300 including a stop valve according to an embodiment. Valve cap 300 includes a distal end 302 and a proximal end 304. Similar to valve cap 200, valve cap 300 may include a valve cap body 310 and a valve cap skirt 350. Valve cap body 310 and valve cap skirt 350 may be the same as or similar to valve cap body 210 and valve cap skirt 250. Also, similar to valve cap 200, valve cap 300 attaches to proximal end 114 of bottle 110. In some embodiments, valve cap 300 may liquid-tightly attach to neck 120 via a connector 320. Connector 320 may be the same as or similar to connector 220. A dispensing outlet 318 of valve cap 300 may include a valve 332 positioned in or adjacent to a through hole 319 to regulate the flow of product from bottle 110 through dispensing outlet 318. In some embodiments, dispensing outlet 318 may include a valve support 328 for securing valve 332 to valve cap 300. Valve support 328 may be the same as or similar to valve support 228. Valve 332 may be the same as or similar to valve 152 discussed above.

Valve cap 300 also includes a valve assembly 360. Valve assembly 360 may include a valve body 364, and a stop valve 372. Valve body 364 is a hollow structure having a proximal opening 368 and one or more distal openings 366. In some embodiments, distal openings 366 may be formed in a side wall of valve body 364.

Figure 8A:
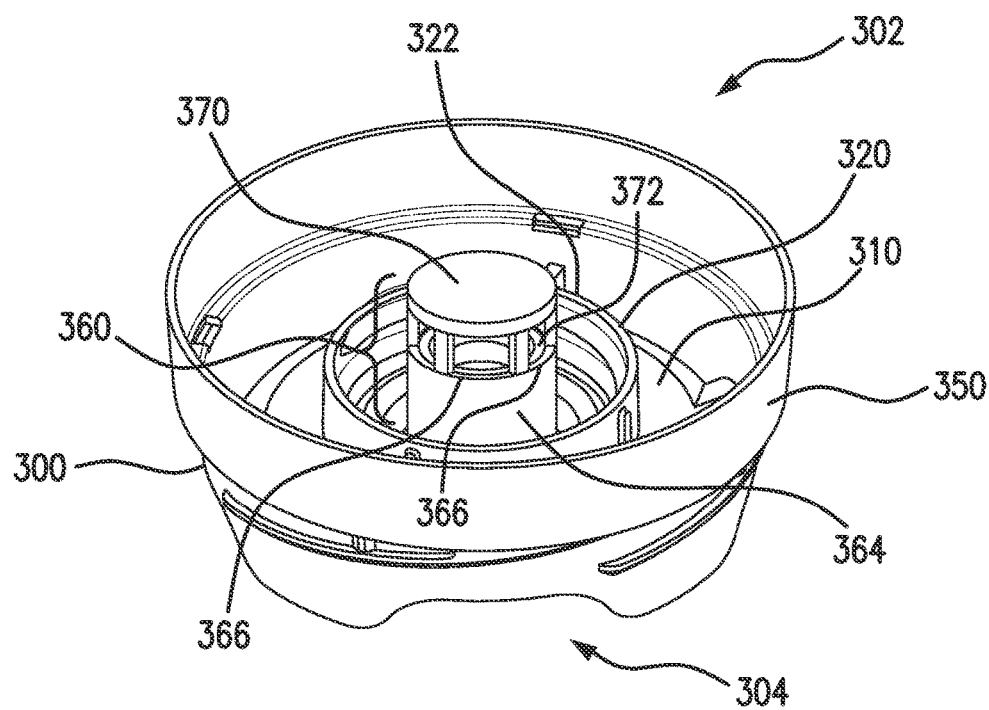
FIGS. 8A and 8B show perspective views of a valve cap according to an embodiment in a first position and a second position, respectively.
Figure 10A:
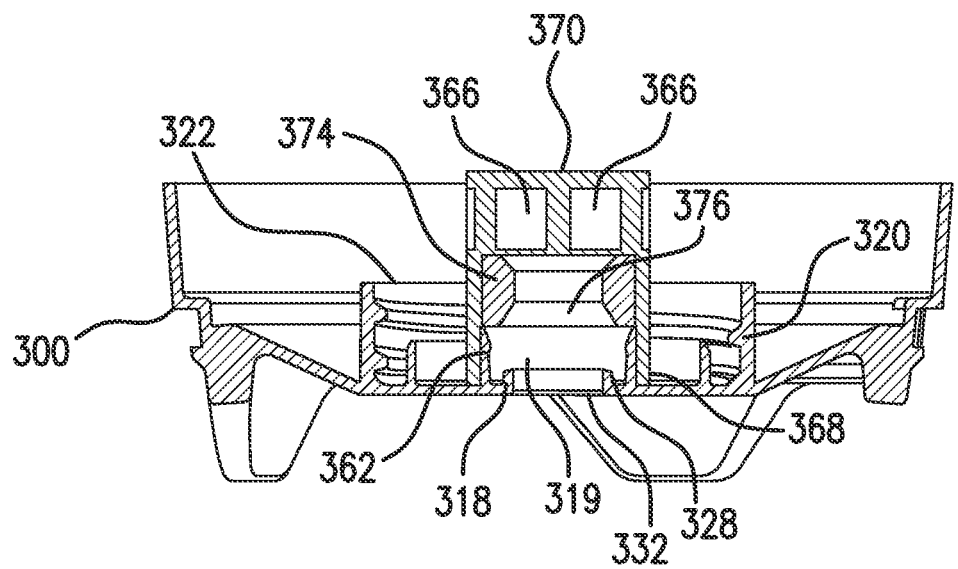
FIGS. 10A and 10B show cross-sectional views of a valve cap according to an embodiment in a first position and a second position, respectively.

Valve body 364 may be secured to a fitting 362 connected to valve cap body 310. In some embodiments, fitting 362 may be integrally formed with valve cap body 310 (e.g., using injection molding and/or machining). In some embodiments, fitting 362 may be a separate piece attached to valve cap body 310 using, for example, an adhesive, a heat weld, a snap fit, or a friction fit. Proximal opening 368 of valve body 364 may be sized and shaped to receive at least a portion of fitting 362. Alternatively, fitting 362 may be sized and shaped to receive at least a portion of valve body 364. Valve body 364 may be secured to fitting 362 using, for example, an adhesive, a heat weld, a snap fit, or a friction fit. When secured to fitting 362, proximal opening 368 and distal openings 366 are in fluid communication with valve 332. When valve cap 300 is in an inverted position (as shown in FIGS. 8A and 10A), proximal opening 368 is disposed below distal openings 366. When valve cap 300 is in an upright position (as shown in FIGS. 8B and 10B), proximal opening 368 is disposed above distal openings 366.

Figure 8B:
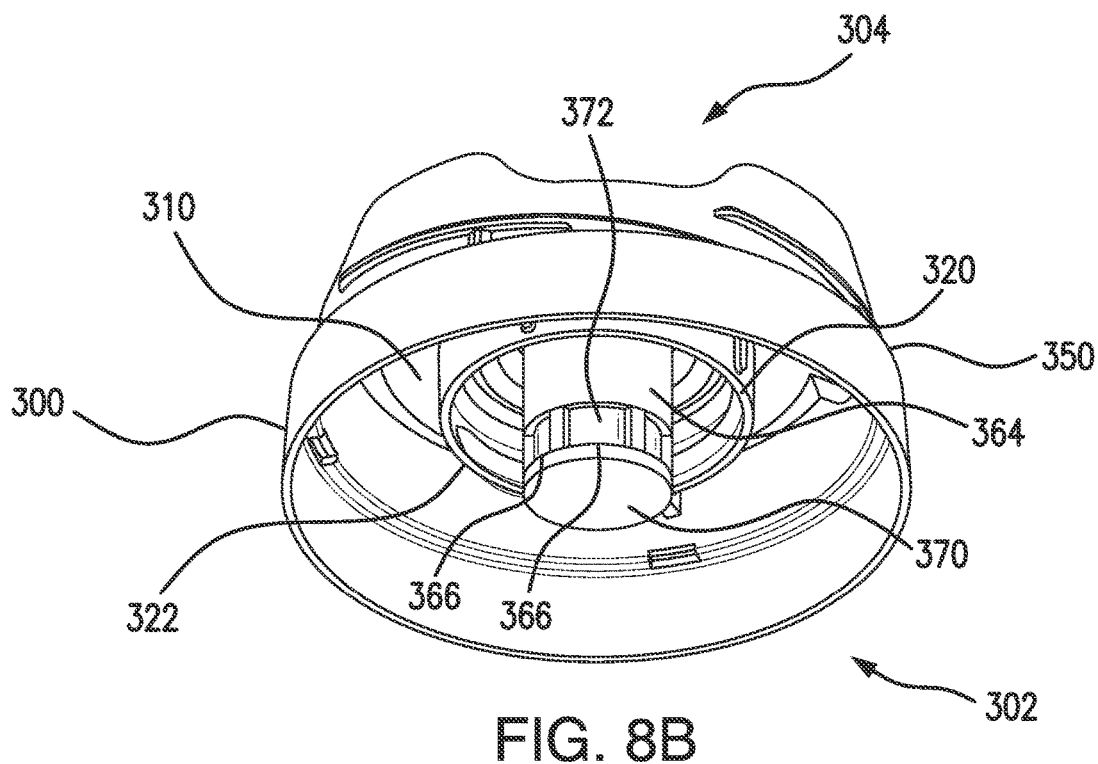
Figure 9:
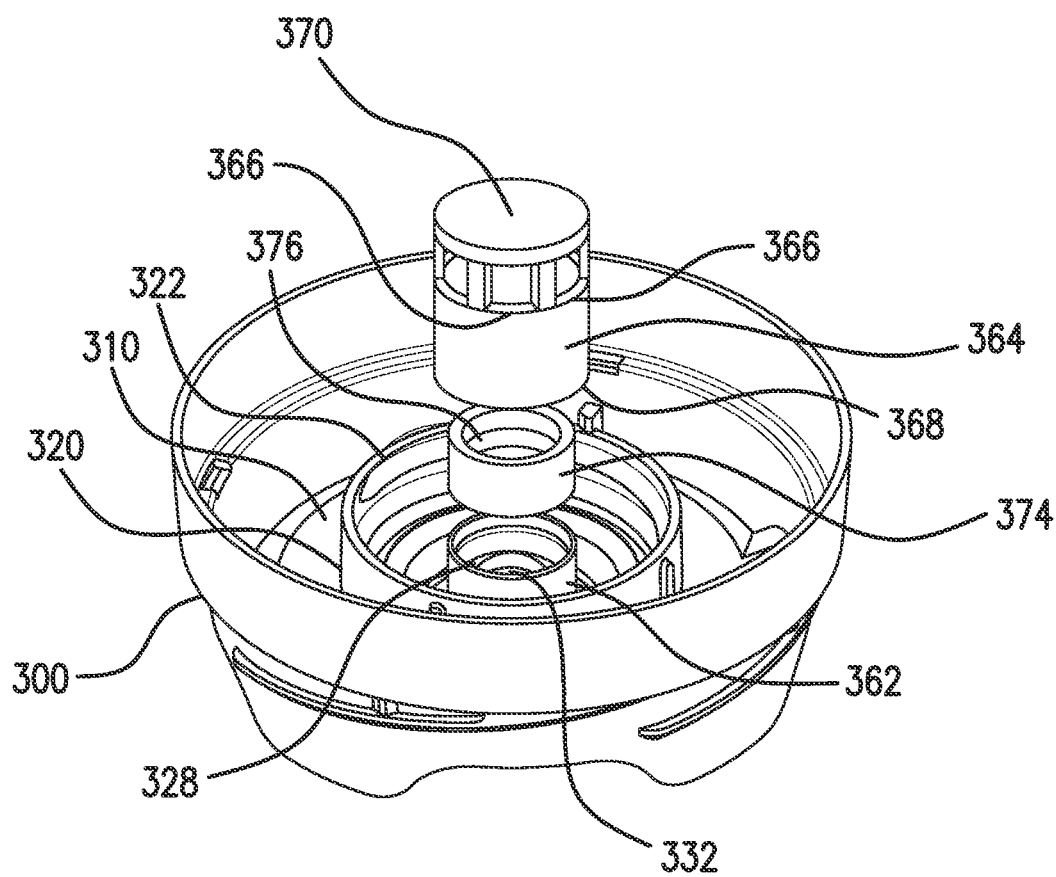
FIG. 9 shows an exploded perspective view of a valve cap according to an embodiment.
Figure 10B:
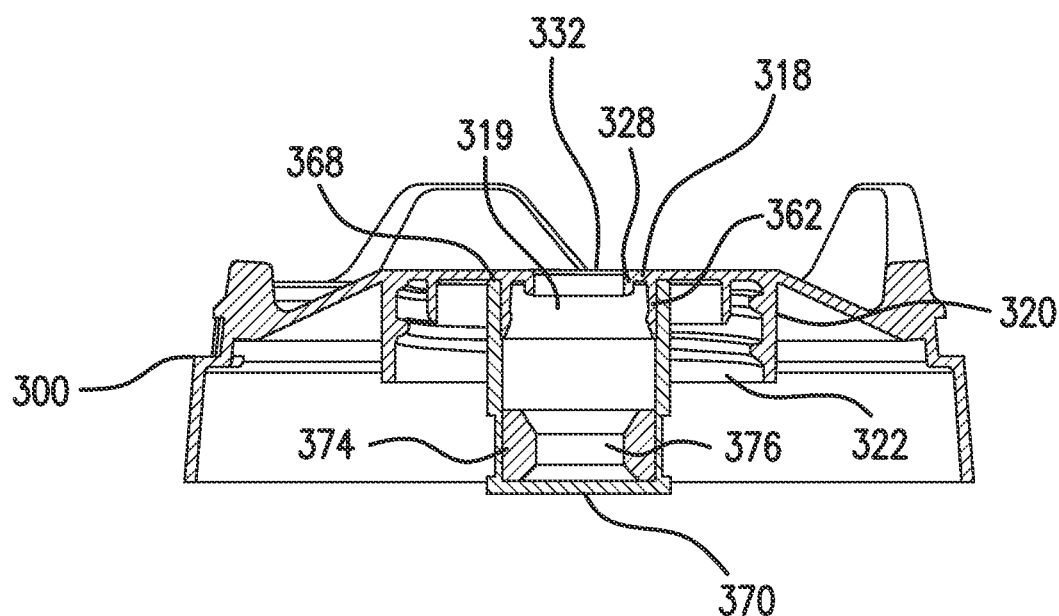

Stop valve 372 may be moveable within valve body 364 between an open position (see FIGS. 8A and 10A) and a closed position (see FIGS. 8B and 10B). The open position is the position of valve cap 300 when it is attached to bottle 110 and dispensing system 100 is in an inverted position (see e.g., FIG. 1). The closed position is the position of valve cap 300 when attached to bottle 110 and dispensing system 100 is in an upright position (i.e., FIG. 1 rotated 180°). In the open/inverted position, stop valve 372 opens one or more distal openings 366 formed in valve body 364. In the closed/upright position, stop valve 372 closes distal openings 366.

As such, when dispensing system 100 is in an inverted position, stop valve 372 allows flowable product to be dispensed from bottle 110 via valve cap 300 (e.g., when bottle 110 is squeezed by a user). In contrast, when dispensing system 100 is in an upright position, stop valve 372 prevents flowable product from being dispensed from bottle 110 via valve cap 300 even if bottle 110 is squeezed by a user. The operation of stop valve 372 may prevent unintentional discharge of flowable product when bottle 110 is in the upright position.

As shown in FIG. 8, stop valve 372 may include a plunger in the form of a hollow ring 374 having a hollow center 376. Hollow ring 374 may be slidably disposed within valve body 364 so as to slide between fitting 362 (in the open/inverted position) and a stop wall 370 of valve body 364 (in the closed/upright position) (compare FIGS. 10A and 10B). In operation, hollow ring 374 blocks flowable product from entering valve body 364 via distal openings 366 when in the closed/upright portion, but allows product to enter and flow through valve body 364 via distal openings 366 in the open/inverted position. In the open/inverted position, flowable product may flow through valve body 364 towards valve 332 to be dispensed (e.g., when bottle 110 is squeezed by a user).

FIGS. 11A-13B show a valve cap 400 including a stop valve according to an embodiment. Valve cap 400 includes a distal end 402 and a proximal end 404. Similar to valve cap 200, valve cap 400 may include a valve cap body 410 and a valve cap skirt 450. Valve cap body 410 and valve cap skirt 450 may be the same as or similar to valve cap body 210 and valve cap skirt 250. Also similar to valve cap 200, valve cap 400 attaches to proximal end 114 of bottle 110. In some embodiments, valve cap 400 may liquid-tightly attach to neck 120 via a connector 420. Connector 420 may be the same as or similar to connector 220. A dispensing outlet 418 of valve cap 400 may include a valve 432 positioned in or adjacent to a through hole 419 to regulate the flow of product from bottle 110 through dispensing outlet 418. In some embodiments, dispensing outlet 418 may include a valve support 428 for securing valve 332 to valve cap 300. Valve support 428 may be the same as or similar to valve support 228. Valve 432 may be the same as or similar to valve 152 discussed above.

Valve cap 400 also includes a valve assembly 460. Valve assembly 460 may include a valve body 464, and a stop valve 472. Similar to valve body 364, valve body 464 is a hollow structure having a proximal opening 468 and one or more distal openings 466. In some embodiments, distal openings 466 may be formed in a side wall of valve body 464.

Figure 11A:
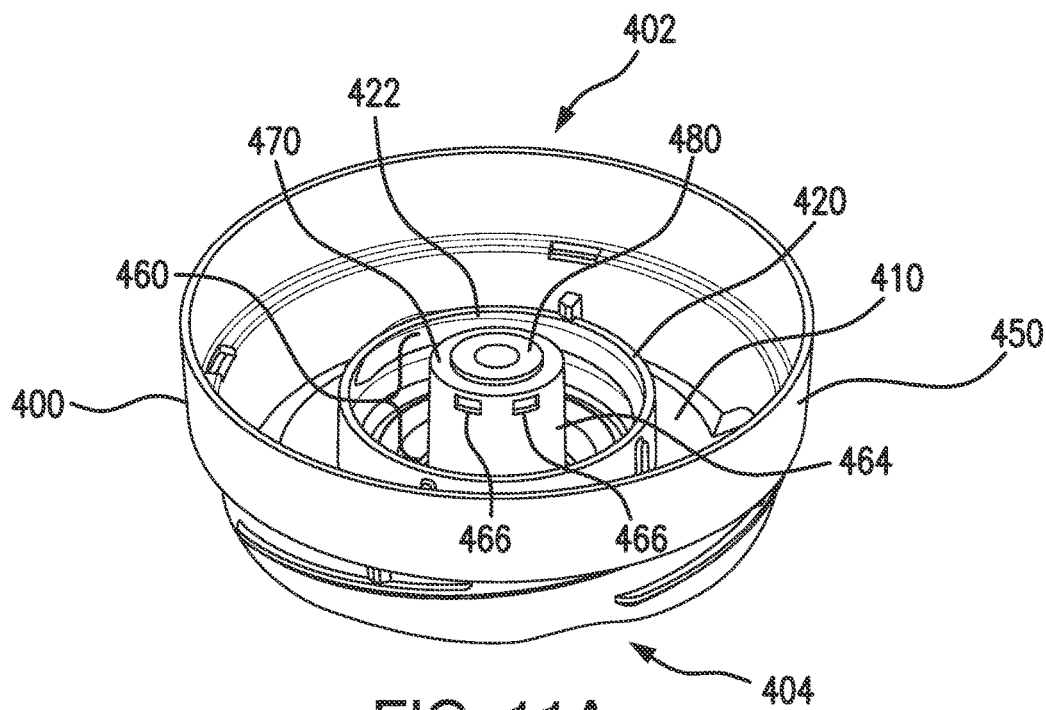
FIGS. 11A and 11B show perspective views of a valve cap according to an embodiment in a first position and a second position, respectively.
Figure 13A:
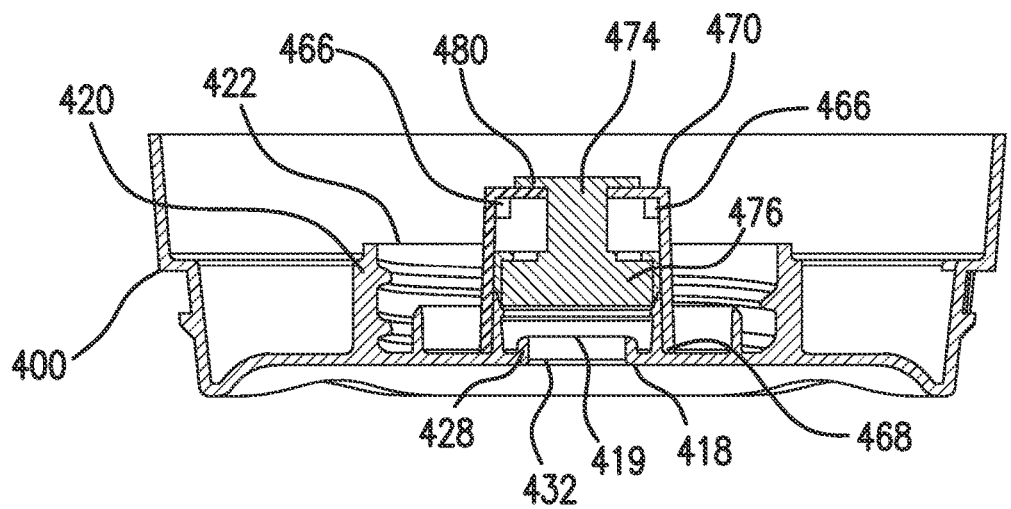
FIGS. 13A and 13B show cross-sectional views of a valve cap according to an embodiment in a first position and a second position, respectively.

Valve body 464 may be secured to a fitting 462 connected to valve cap body 410. In some embodiments, fitting 462 may be integrally formed with valve cap body 410 (e.g., using injection molding and/or machining). In some embodiments, fitting 462 may be a separate piece attached to valve cap body 410 using, for example, an adhesive, a heat weld, a snap fit, or a friction fit. Proximal opening 468 of valve body 464 may be sized and shaped to receive at least a portion of fitting 462. Alternatively, fitting 462 may be sized and shaped to receive at least a portion of valve body 464. Valve body 464 may be secured to fitting 462 using, for example, an adhesive, a heat weld, a snap fit, or a friction fit. When secured to fitting 462, proximal opening 468 and distal openings 466 are in fluid communication with valve 432. When valve cap 400 is in an inverted position (as shown in FIGS. 11A and 13A), proximal opening 468 is disposed below distal openings 466. When valve cap 400 is in an upright position (as shown in FIGS. 11B and 13B), proximal opening 468 is disposed above distal openings 466.

Figure 11B:
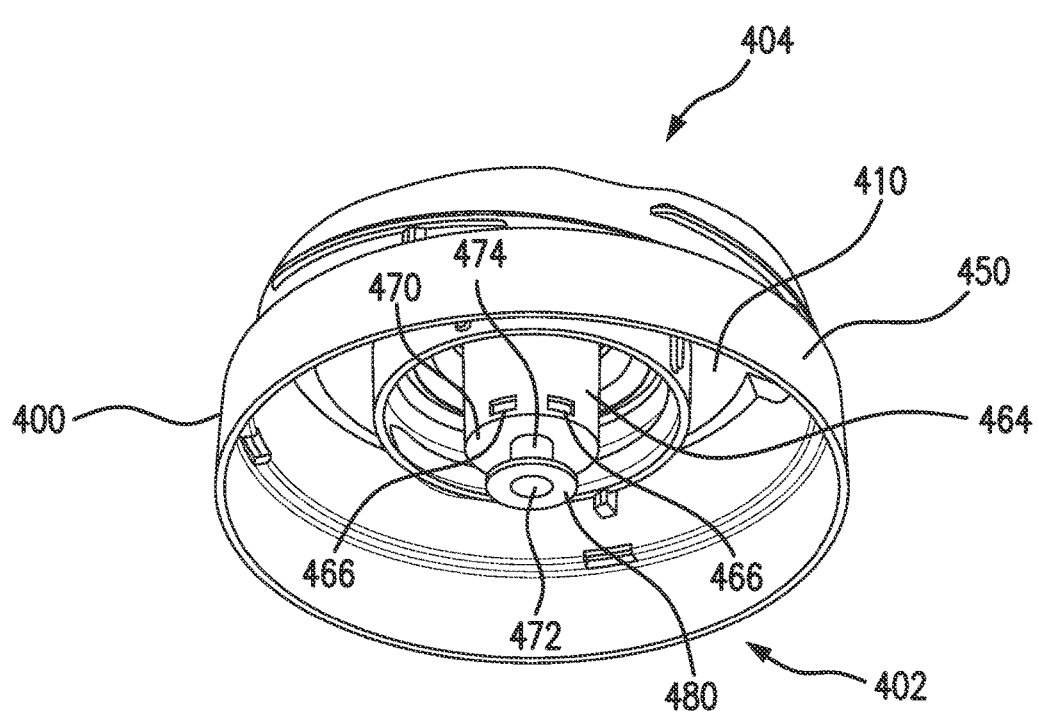
Figure 13B:
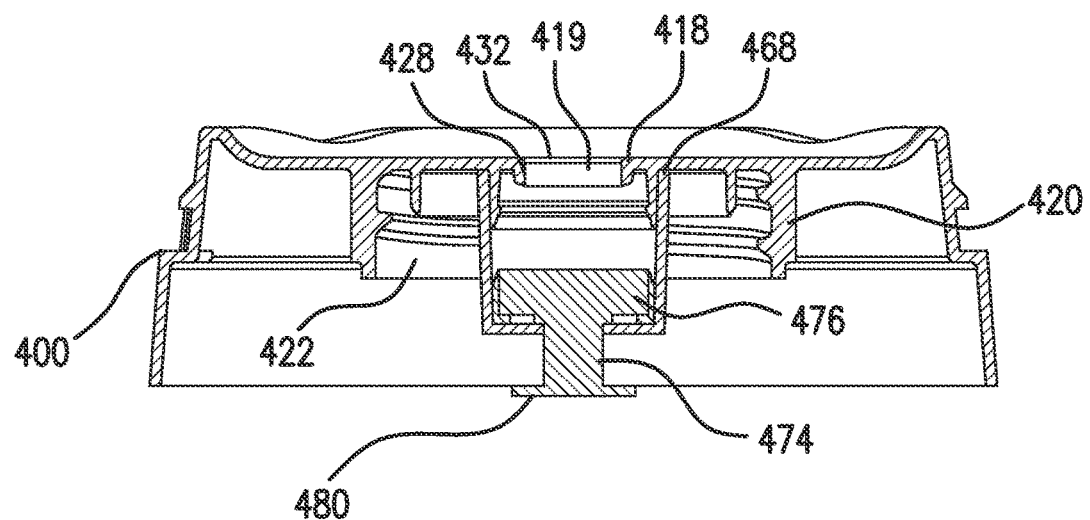

Stop valve 472 may be moveable within valve body 464 between an open position (see FIGS. 11A and 13A) and a closed position (see FIGS. 11B and 13B). The open position is the position of valve cap 400 when it is attached to bottle 110 and dispensing system 100 is in an inverted position (see e.g., FIG. 1). The closed position is the position of valve cap 400 when attached to bottle 110 and dispensing system 100 is in an upright position (i.e., FIG. 1 rotated 180°). In the open/inverted position, stop valve 472 opens one or more distal openings 466 formed in valve body 464. In the closed/upright position, stop valve 472 closes distal openings 466.

As such, when dispensing system 100 is in an inverted position, stop valve 472 allows flowable product to be dispensed from bottle 110 via valve cap 400 (e.g., when bottle 110 is squeezed by a user). In contrast, when dispensing system 100 is in an upright position, stop valve 472 prevents flowable product from being dispensed from bottle 110 via valve cap 400 even if bottle 110 is squeezed by a user. The operation of stop valve 472 may prevent unintentional discharge of flowable product when bottle 110 is in the upright position.

Figure 12:
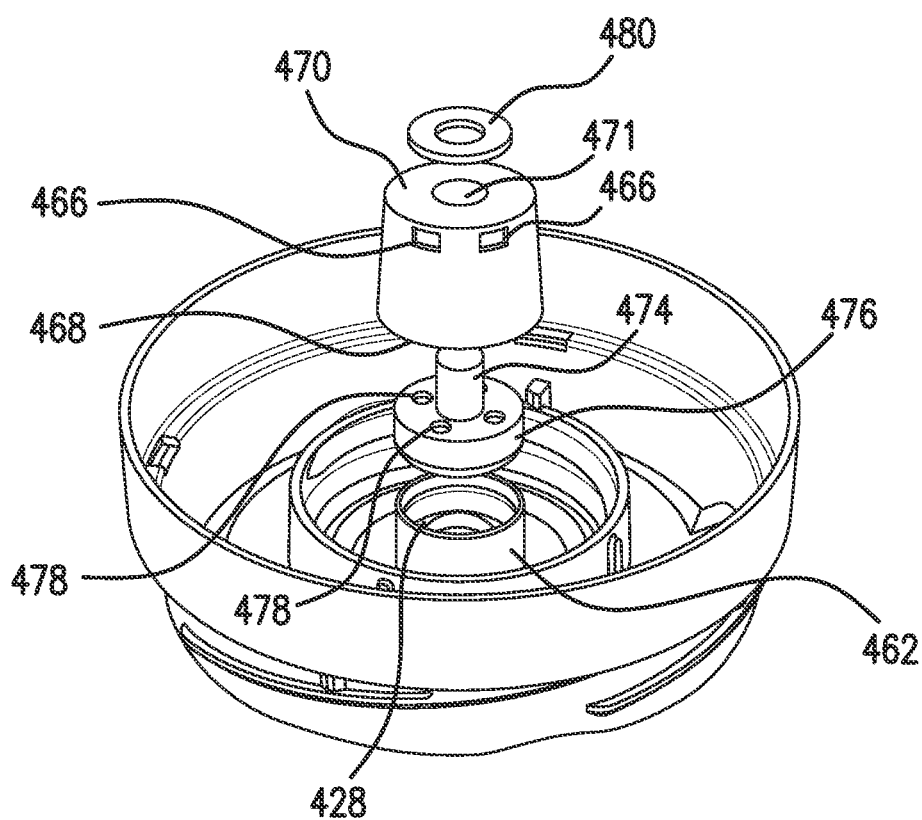
FIG. 12 shows an exploded perspective view of a valve cap according to an embodiment.

As shown, for example in FIG. 12, stop valve 472 may include a plunger having a plug 476 and retainer 480 connected to opposite ends of a shaft 474. Plug 476 may be slidably disposed within valve body 464 so as to slide between fitting 462 (in the open/inverted position) and a stop wall 470 of valve body 464 (in the closed/upright position) (compare FIGS. 13A and 13B). Stop wall 470 may include an opening 471 sized and shaped to slidably receive shaft 474. The slidable interface between opening 471 and shaft 474 may guide plug 476 between the open position and the closed position. Retainer 480 may serve to prevent shaft 474 from sliding completely through opening 471 and may serve to properly position plug 476 within valve body 464 in the closed position. In some embodiments, plug 476 may include one or more orifices 478 that allow flowable product to flow through plug 476 towards valve 432 when stop valve 472 is in the open/inverted position.

In operation, plug 476 blocks flowable product from entering valve body 464 via distal openings 466 when in the closed/upright portion, but allows product to enter and flow through valve body 464 via distal openings 466 in the open/inverted position. In the open/inverted position, flowable product may flow through valve body 464 towards valve 432 to be dispensed (e.g., when bottle 110 is squeezed by a user).

Figure 14A:
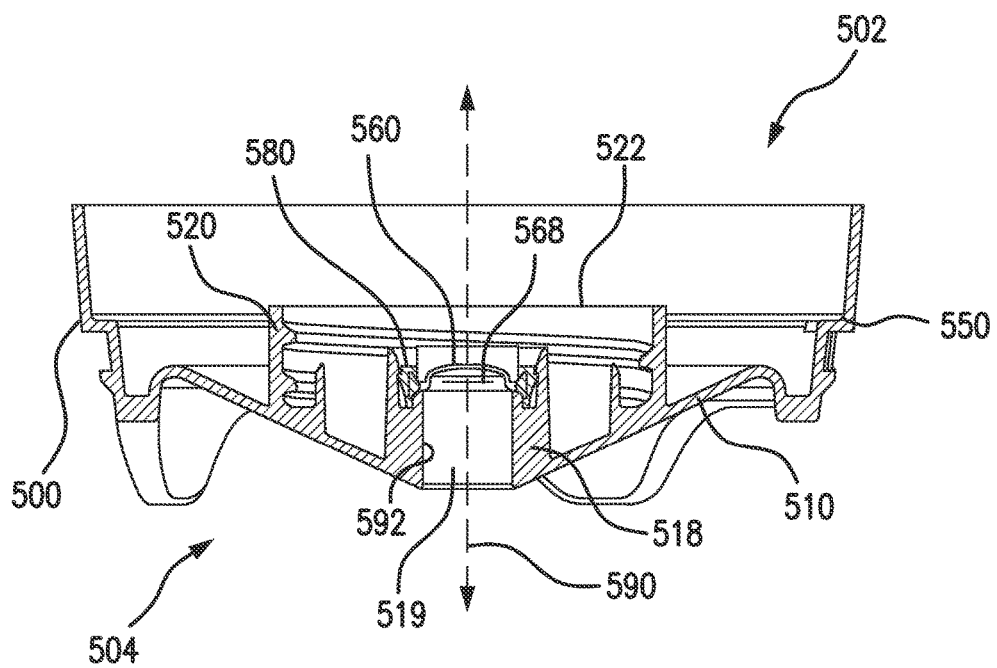
FIGS. 14A and 14B show cross-sectional views of a valve cap according to an embodiment in a first position and a second position, respectively.
Figure 14B:
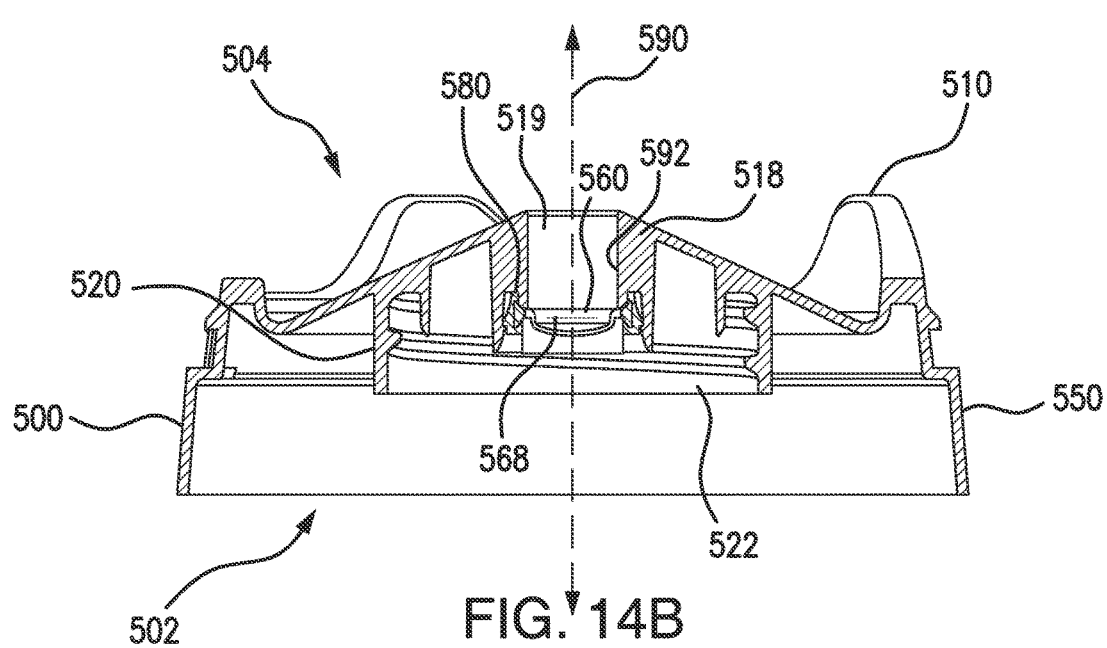

FIGS. 14A and 14B show a valve cap 500 according to an embodiment. Valve cap 500 includes a distal end 502 and a proximal end 504. Similar to valve cap 200, valve cap 500 may include a valve cap body 510 and a valve cap skirt 550. Valve cap body 510 and valve cap skirt 550 may be the same as or similar to valve cap body 210 and valve cap skirt 250. Also similar to valve cap 200, valve cap 500 attaches to proximal end 114 of bottle 110. In some embodiments, valve cap 500 may liquid-tightly attach to neck 120 via a connector 520. Connector 520 may be the same as or similar to connector 220. A dispensing outlet 518 of valve cap 500 may include a valve 560 positioned in or adjacent to a through hole 519 to control the flow of product from bottle 110 through dispensing outlet 518. Valve 560 may be secured within or adjacent to through hole 519 using a retainer 580. In some embodiments, as shown in FIGS. 14A and 14B, through hole 519 may be an elongated through hole.

Figure 15:
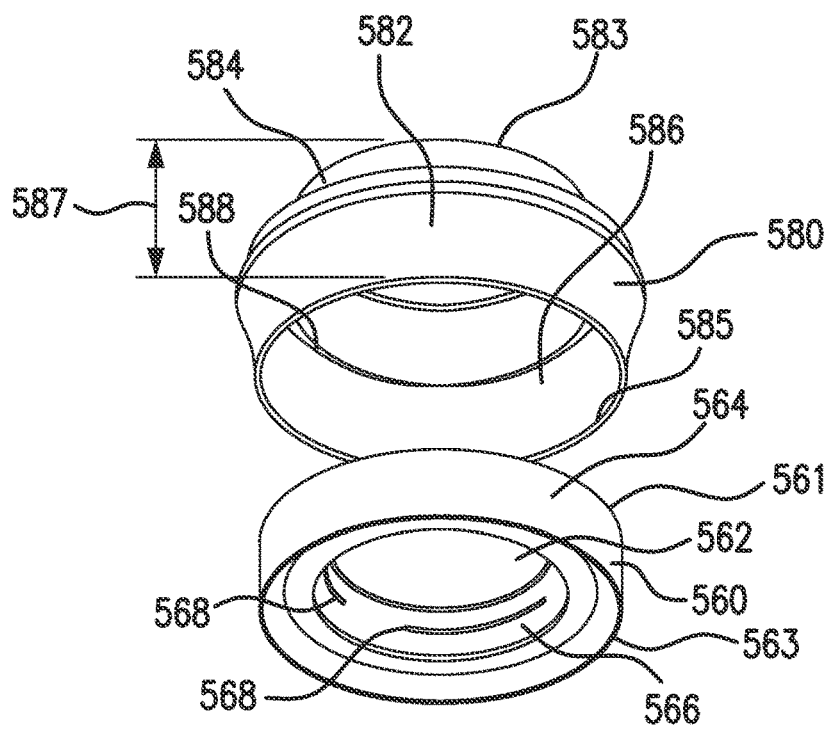
FIG. 15 shows an exploded perspective view of a valve and retainer according to an embodiment.

FIG. 15 shows valve 560 and retainer 580 according to an embodiment. Valve 560 may include an outer wall 564 and an inner wall 566 attached to outer wall 564. Inner wall 566 may be attached to a polymeric membrane 562 that is in direct fluid communication with opening 122 of bottle 110 when valve cap 500 is attached to bottle 110. Inner wall 566 is configured to invert (i.e., unfold) when valve 560 is actuated (e.g., when a user squeezes bottle 110).

Retainer 580 may include a hollow body 582 having an open proximal end 585 and an open distal end 583. And hollow body 582 may define a coupling 584 and a valve seat 586. Valve seat 586 may be sized and shaped to receive at least a portion valve 560. When assembled, at least a portion of valve 560 is received within valve seat 586 and a distal rim 561 of outer wall 564 may be seated on a ledge 588 of valve seat 586. Coupling 584 may secure retainer 580 within or adjacent to through hole 519. And coupling 584 may be secured within or adjacent to through hole 519 using, for example, an adhesive, welding, a snap fit, or a friction fit. In some embodiments, retainer 580 may have a height 587, measured from open proximal end 585 to open distal end 583, that is less than or equal to the overall height, measured from a proximal rim 563 of outer wall 564 to the top of polymeric membrane 562, of valve 560. A retainer 580 having a height 587 that is less than or equal the overall height of valve 560 is deemed to be a "low profile" retainer. Such low profile embodiments may reduce the accumulation of residue between valve 560 and retainer 580 (e.g., by reducing the volume of space 730 as discussed below in reference to FIG. 17A). In some embodiments, the height 587 is less than the overall height of valve 560. In some embodiments, height 587 of retainer 580 is such that at least a portion of valve 560 (e.g., at least a portion of polymeric membrane 562) extends from open distal end 583 when valve 560 and retainer 580 are assembled (see, e.g., FIGS. 17A and 17B). In some embodiments, retainer 580 may have a ring shape.

In operation, polymeric membrane 562 is forced up and down when bottle 110 is squeezed by a user. When polymeric membrane 562 is forced downward (i.e., towards open proximal end 585 of retainer 580), one or more slits 568 formed in inner wall 566 open due to polymeric membrane 562 pulling inner wall 566 downwards. The downward force of polymeric membrane 562 opens slits 568 and allows flowable product to be dispensed from bottle 110 through dispensing outlet 518, via open slits 568. When the squeezing force on bottle 110 is removed, polymeric membrane 562 moves upward towards open distal end 583 of retainer 580, inner wall 566 folds back towards distal rim 561 of outer wall 564, and slits 568 close, thereby sealing opening 122 of bottle 110.

The configuration of valve 560 and the location of slits 568 on inner wall 566 allows flowable product to be dispensed, but may also help prevent unintentional discharge of flowable product. Due to their location, slits 568 open in a direction perpendicular to a center dispensing axis 590 of through hole 519. And, when valve cap 500 is in an inverted position (see FIG. 14A), flowable product located at opening 122 of bottle (due to gravity) can be squeezed through slits 568, into through hole 519, and out of dispensing outlet 518. But, when valve cap 500 is in an upright position (see FIG. 14B), any residue located in or around opening 122, connector, and/or retainer 580 is directed towards a sidewall 592 of through hole 519. As such, the residue is deflected off side wall 592 of through hole 519 rather than being discharged straight through through hole 519 in the direction of center dispensing axis 590.

Figure 16:
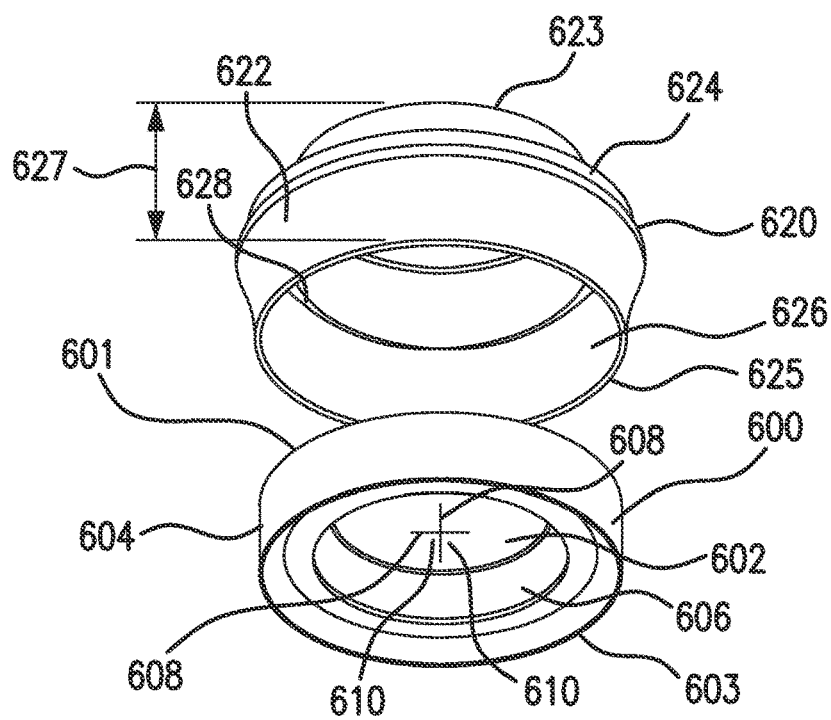
FIG. 16 shows an exploded perspective view of a valve and retainer according to an embodiment.

FIG. 16 shows a valve 600 and a retainer 620 according to an embodiment. Valve 600 may include an outer wall 604 and an inner wall 606 attached to outer wall 604. Inner wall 606 may be attached to a polymeric membrane 602 that is in direct fluid communication with opening 122 of bottle 110 when a valve cap (e.g., valve cap 140) is attached to bottle 110. Similar to inner wall 566, inner wall 606 is configured to invert (i.e., unfold) when valve 600 is actuated (e.g., when a user squeezes bottle 110).

Retainer 620 may include a hollow body 622 having an open proximal end 625 and an open distal end 623. Hollow body 622 of retainer 620 may define a coupling 624 and a valve seat 626. Valve seat 626 may be sized and shaped to receive at least a portion of valve 600. When assembled, at least a portion of valve 600 is received within valve seat 626 and a distal rim 601 of outer wall 604 may be seated on a ledge 628 of valve seat 626. Coupling 624 may secure retainer 620 within or adjacent to a through hole of a dispensing outlet (e.g., through hole 219 of dispensing outlet 218). And coupling 624 may be secured within or adjacent to the through hole using, for example, an adhesive, welding, a snap fit, or a friction fit. In some embodiments, retainer 620 may be a low profile retainer having a height 627, measured from open distal end 623 to open proximal end 625, that is less than or equal to the overall height, measured from a proximal rim 603 of outer wall 604 to the top of polymeric membrane 602, of valve 600. In some embodiments, height 627 is less than the overall height of valve 600. In some embodiments, the height 627 of retainer 620 is such that at least a portion of valve 600 (e.g., at least a portion of polymeric membrane 602) extends from open distal end 623 when valve 600 and retainer 620 are assembled (see, e.g., FIGS. 17A and 17B). In some embodiments, retainer 620 may have a ring shape.

In operation, polymeric membrane 602 is forced up and down when bottle 110 is squeezed by a user. When polymeric membrane 602 is forced downward (i.e., towards open proximal end 625 of retainer 620), one or more flexible flaps 610 defined by one or more slits 608 formed in polymeric membrane 602 open due to the downward force on polymeric membrane 602. Flaps 610 open as inner wall 606 unfolds towards proximal rim 603 of outer wall 604 and allow flowable product to be dispensed from bottle 110. When the squeezing force on bottle 110 is removed, inner wall 606 folds back towards distal rim 601 of outer wall 604, polymeric membrane 602 moves upward towards open distal end 623 of retainer 620, and flaps 610 close, thereby sealing opening 122 of bottle 110.

Figure 17A:
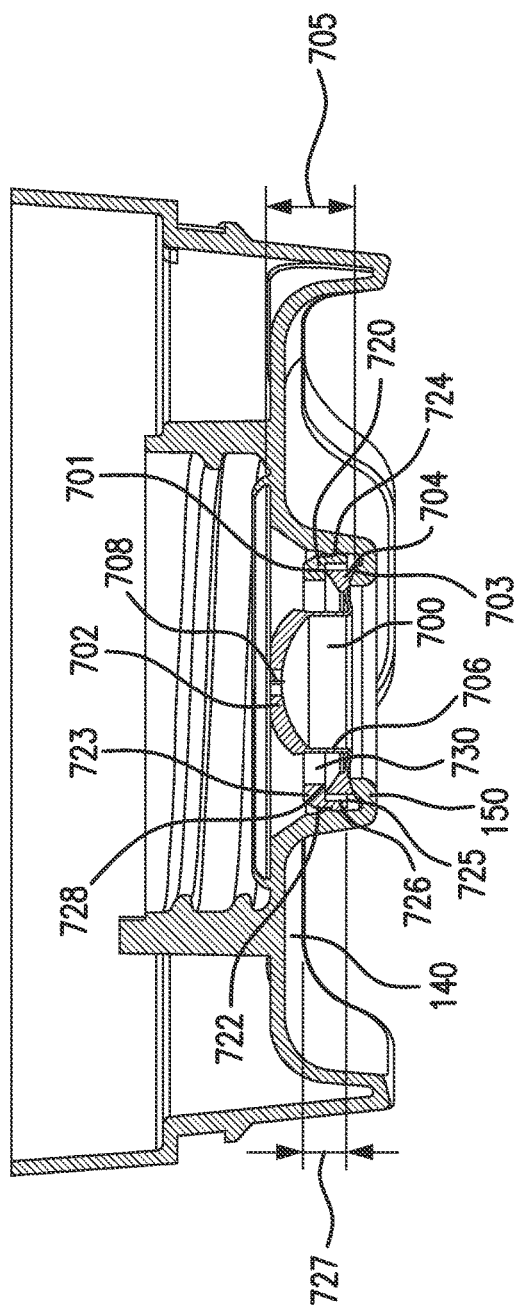
FIGS. 17A and 17B show a valve and retainer according to an embodiment.
Figure 17B:
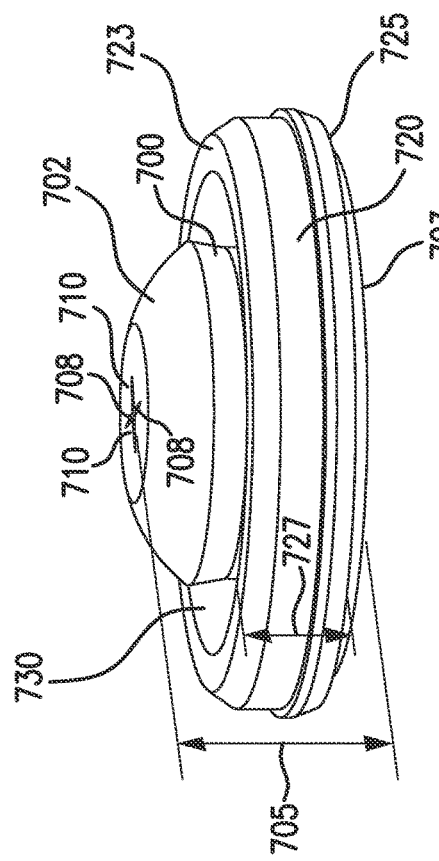

FIGS. 17A and 17B show a valve 700 and a retainer 720 according to an embodiment. FIG. 17A shows valve 700 secured to a valve cap (e.g., valve cap 140) using valve retainer 720. Valve 700 may include an outer wall 704 and an inner wall 706 attached to outer wall 704. Inner wall 706 may be attached to a polymeric membrane 702 that is in direct fluid communication with opening 122 of bottle 110 when valve cap 140 is attached to bottle 110. Similar to inner walls 566 and 606, inner wall 706 is configured to invert (i.e., unfold) when valve 700 is actuated (e.g., when a user squeezes bottle 110). As shown in FIGS. 17A and 17B, polymeric membrane 702 may have a hemispherical shape with at least a portion of the hemispherical shape extending from an open distal end 723 of valve retainer 720.

Retainer 720 may include a hollow body 722 having an open proximal end 725 and open distal end 723. Hollow body 722 of retainer 720 may define a coupling 724 and a valve seat 726. Valve seat 726 may be sized and shaped to receive at least a portion of valve 700. When assembled, at least a portion of valve 700 is received within valve seat 726 and a distal rim 701 of outer wall 704 may be seated on a ledge 728 of valve seat 726. Coupling 724 may secure retainer 720 within or adjacent to a through hole of a dispensing outlet (e.g., dispensing outlet 150). And coupling 724 may be secured within or adjacent to the through hole using, for example, an adhesive, welding, a snap fit, or a friction fit. In some embodiments, retainer 720 may have a ring shape.

As shown in FIGS. 17A and 17B, retainer 720 is a low profile retainer having a height 727, measured from open proximal end 725 to open distal end 725, that is less than the overall height 705, measured from a proximal rim 703 of outer wall 704 to the top of polymeric membrane 702, of valve 700. In some embodiments, as shown in FIGS. 17A and 17B, the overall height 705 of valve 700 may be such that at least a portion of polymeric membrane 702 extends from open distal end 723 of retainer 720. In other words, the overall height 705 of valve 700 is greater than a distance measured from proximal rim 703 to open distal end 723 of retainer 720 when valve 700 and retainer 720 are assembled.

In operation, polymeric membrane 702 is forced up and down when bottle 110 is squeezed by a user. When polymeric membrane 702 is forced downward (i.e., towards open proximal end 725 of retainer 720), one or more flexible flaps 710 defined by one or more slits 708 formed in polymeric membrane 702 open due to the downward force on polymeric membrane 702. Flaps 710 open as inner wall 706 unfolds towards proximal rim 703 of outer wall 704 and allow flowable product to be dispensed from bottle 110. When the squeezing force on bottle 110 is removed, inner wall 706 folds back towards distal rim 701 of outer wall 704, polymeric membrane 702 moves upward towards and through open distal end 723 of retainer 720, and flaps 710 close, thereby sealing opening 122 of bottle 110.

The use of a low profile retainer (e.g., retainer 720) reduces the volume of void space 730 present between a valve (e.g., valve 700) and the retainer when the two are assembled. Residue trapped within void space 730 may be inadvertently discharged when valve 700 is actuated while bottle 110 is in an upright position. A reduction in void space 730 reduces the volume of residue that may accumulate between valve 700 and retainer 720. This in turn reduces the amount of residue that may be inadvertently discharged from bottle 110 when bottle 110 is an upright position (see comparison of different valve/valve retainer assemblies in Table 1 below). A retainer having a larger height (e.g., a height extending above the top of polymeric membrane 702) would not only increase the volume of void space 730, but may also allow residue to remain collected near polymeric membrane 702 even when bottle 110 is in an upright position (e.g., due to capillary forces holding residue within the portion of the retainer that extends above the top of polymeric membrane 702).

Table 1 below shows the amount of residue in grams accumulated within the void space 730 described above for two standard valve/valve retainer assemblies and three low profile valve/valve retainer assemblies. The V21-200 (Standard) valve/valve retainer assembly includes a V21-200 valve and a standard retainer having a height greater than the overall height of the V21-200 valve. The V21-200 (Low Profile) valve/valve retainer assembly includes a V21-200 valve and a low profile retainer. The V1-187 (Standard) valve/valve retainer assembly includes a V1-187 valve and a standard retainer having a height greater than the overall height of the V1-187 valve. The V1-187 (Low Profile 1) valve assembly includes a V1-187 valve and a low profile retainer. The V1-187 (Low Profile 2) valve assembly includes a V1-187 valve and a retainer having a height less than the overall height of the V1-187 valve as shown in FIGS. 17A and 17B. In each test, a bottle having a valve cap with the respective valve and retainer attached thereto was inverted to allow flowable product to collect in the open proximal end. The bottle was then turned upright and the residue collected within the open proximal end was discharged by squeezing the bottle. The discharged residue was collected on a cloth and weighed.

TABLE 1

Residue (in grams) collected in various valve/valve retainer assemblies

| Test No. | V21-200 (Standard) | V21-200 (Low Profile) | V1-187 (Standard) | V1-187 (Low Profile 1) | V1-187 (Low Profile 2) |
|---|---|---|---|---|---|
| 1 | 0.04 | 0.03 | 0.03 | 0.01 | 0.02 |
| 2 | 0.06 | 0.03 | 0.06 | 0.01 | 0.01 |
| 3 | 0.06 | 0.01 | 0.04 | 0.02 | 0.03 |
| 4 | 0.06 | 0.02 | 0.04 | 0.02 | 0.02 |
| 5 | 0.06 | 0.02 | 0.06 | 0.02 | 0.02 |
| 6 | 0.06 | 0.03 | 0.06 | 0.02 | 0.02 |
| 7 | 0.07 | 0.02 | 0.07 | 0.01 | 0.01 |
| 8 | 0.04 | 0.03 | 0.09 | 0.02 | 0.04 |

TABLE 1-continued

Residue (in grams) collected in various valve/valve retainer assemblies

| Test No. | V21-200 (Standard) | V21-200 (Low Profile) | V1-187 (Standard) | V1-187 (Low Profile 1) | V1-187 (Low Profile 2) |
|---|---|---|---|---|---|
| 9 |  |  |  | 0.02 | 0.02 |
| Average | 0.05625 | 0.02375 | 0.05625 | 0.017 | 0.021 |

As shown in Table 1, the low profile retainers significantly reduced the amount of residue collected and discharged when compared to their standard counterparts. The low profile V21-200 retainer resulted in approximately 58% less residue collected. And the low profile 1 V1-187 retainer resulted in approximately 66% less residue collected. Additionally, the low profile 2 V1-187 retainer shown in FIGS. 17A and 17B resulted in approximately 63% less residue collected compared to the standard V1-187 retainer.

Figure 18:
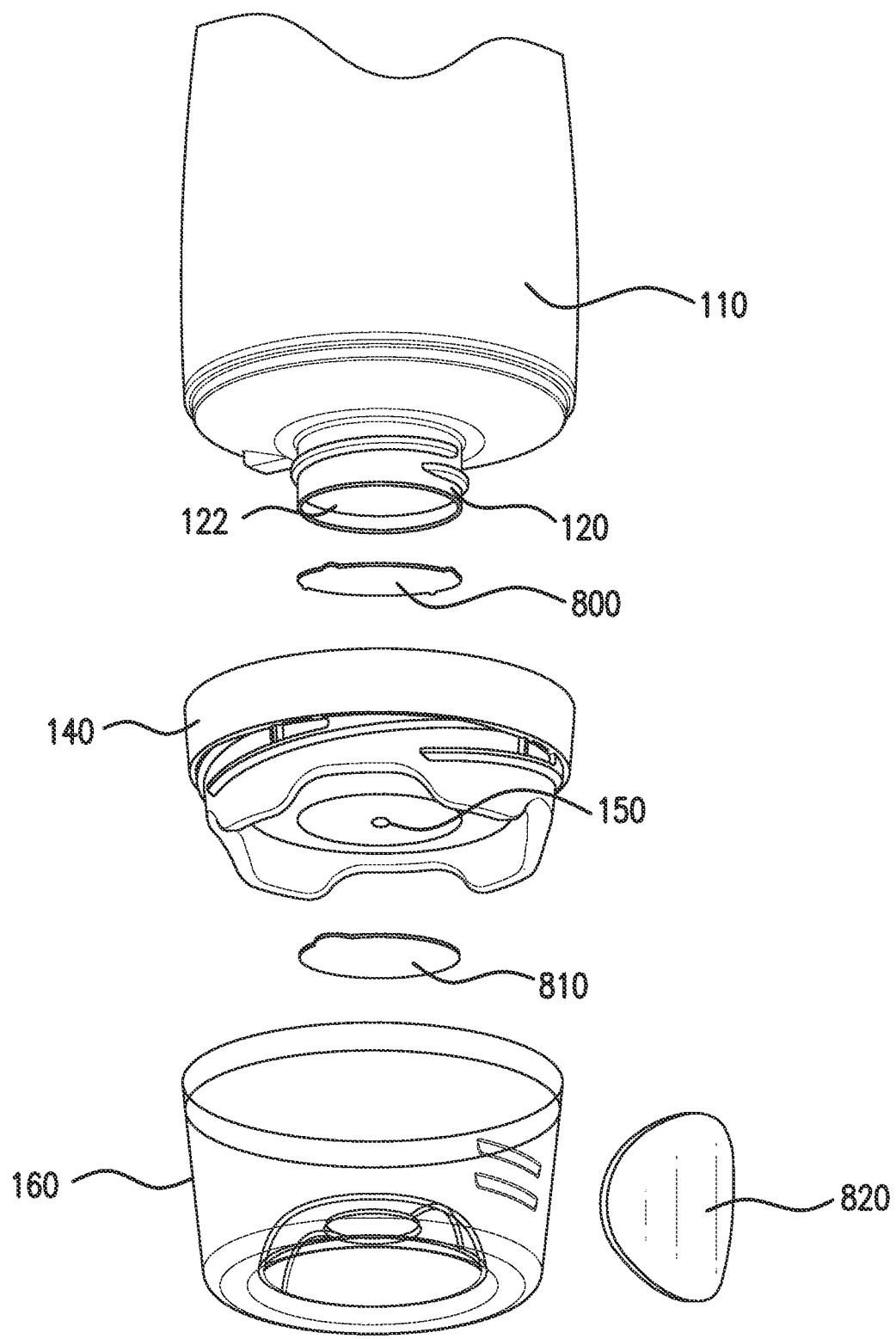
FIG. 18 shows an exploded perspective view of a dispensing system according to an embodiment.

FIG. 18 shows an exploded view of a dispensing system according to an embodiment. The dispensing system may include one or more removable seals, such as an induction seal 800 and an external seal 810. In some embodiments, the dispensing system may include both induction seal 800 and external seal 810. Induction seal 800 may liquid-tightly seal opening 122 of bottle 110. External seal 810 may seal a dispensing outlet of a valve cap (e.g., dispensing outlet 150 of valve cap 140). In some embodiments, induction seal 800 or external seal 810 may include a portion containing a fragrance (e.g., a fragrant coating or a permeable material that is soaked with a fragrance) so as to allow for a user to ascertain the fragrance of the liquid within the bottle without having to break the seal. In some embodiments, external seal 810 may liquid-tightly seal dispensing outlet 150. In some embodiments, external or induction seal 810/800 may allow air to pass so that a user can smell the contents of bottle 110.

In some embodiments, the dispensing system may include a label 820. Label 820 may be attached to external surface 180 of dosing cap 160. Label 820 may provide information related to at least one of the following: the type of flowable product contained within bottle 110, brand logos, and instructions for use of the dispensing system 100. In some embodiments, label 820 may include a scratch-and-sniff portion that imitates the smell of the flowable product contained within bottle 110 when scratched.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A dispensing system, comprising:
   a bottle including a proximal end and a distal end separated by a side wall which has a portion that is flexible, the proximal end including an opening;
   a valve cap liquid-tightly attached to the opening of the bottle, the valve cap including a valve in fluid communication with the opening of the bottle; and
   a dosing cap attached to the valve cap, including a closed end and an open end;
   wherein the valve cap further includes a venting aperture to allow air flow into and out of the dosing cap;
   wherein the venting aperture allows air to flow into and out of a gap located between the side wall of the bottle and the valve cap; and
   wherein the valve cap allows a flowable product to be dispensed from the bottle into the dosing cap when the dosing cap is locked on the valve cap and the bottle is in an inverted position with the opening disposed below the distal end,
   wherein the valve cap comprises a valve cap body and a skirt disposed radially about the valve cap body, and
   wherein the skirt defines feet that extend towards the closed end of the dosing cap.

2. The dispensing system of claim 1, wherein the valve is in direct fluid communication with an interior volume of the bottle and a receiving chamber of the dosing cap and resealably closes the opening of the bottle.

3. The dispensing system of claim 1, wherein the valve allows a variable amount of flowable product to be dispensed.

4. The dispensing system of claim 1, wherein the skirt defines a first coupling that attaches to a second coupling located on the dosing cap.

5. The dispensing system of claim 1, wherein the dosing cap comprises:
   a base wall, an outer circumferential side wall and an inner circumferential side wall extending from the base wall, and an elevated wall connected to the inner circumferential wall and located between the base wall and the open end of the dosing cap.

6. The dispensing system of claim 5, wherein the elevated wall includes a surface having a concave shape that forms a depression.

7. The dispensing system of claim 5, wherein the outer circumferential side wall defines a second coupling that attaches to a first coupling located on the valve cap.

8. The dispensing system of claim 1, wherein the valve is a slit valve comprising at least one flexible flap.

9. A dispensing system, comprising:
   a bottle including a proximal end and a distal end separated by a side wall which has a portion that is flexible, the proximal end including an opening;

a valve cap liquid-tightly attached to the opening of the bottle, the valve cap including a valve in fluid communication with the opening of the bottle; and a dosing cap attached to the valve cap, including a closed end and an open end;

wherein the valve cap further includes a venting aperture to allow air flow into and out of the dosing cap;

wherein the venting aperture allows air to flow into and out of a gap located between the side wall of the bottle and the valve cap; and wherein the valve cap allows a flowable product to be dispensed from the bottle into the dosing cap when the dosing cap is locked on the valve cap and the bottle is in an inverted position with the opening disposed below the distal end, and wherein the valve is secured to the valve cap using a retainer, and wherein the height of the retainer is less than or equal to the overall height of the valve.

10. The dispensing system of claim 5, wherein the base wall, the outer circumferential side wall, the inner circumferential side wall, and the elevated wall of the dosing cap have continuous curvature.

11. The dispensing system of claim 6, wherein an apex of the depression is positioned directly below the flow path of a flowable product being dispensed from the valve cap when the dosing cap is attached to the valve cap.

12. The dispensing system of claim 9, wherein the valve is in direct fluid communication with an interior volume of the bottle and a receiving chamber of the dosing cap and resealably closes the opening of the bottle.

13. The dispensing system of claim 9, wherein the valve allows a variable amount of flowable product to be dispensed.

14. The dispending system of claim 9, wherein the valve cap comprises a valve cap body and a skirt disposed radially about the valve cap body.

15. The dispending system of claim 14, wherein the skirt defines feet that extend towards the closed end of the dosing cap.

16. The dispensing system of claim 15, wherein the skirt defines a first coupling that attaches to a second coupling located on the dosing cap.

17. The dispensing system of claim 9, wherein the valve is a slit valve comprising at least one flexible flap.

18. The dispensing system of claim 9, wherein the dosing cap comprises:

a base wall, an outer circumferential side wall and an inner circumferential side wall extending from the base wall, and an elevated wall connected to the inner circumferential wall and located between the base wall and the open end of the dosing cap.

19. The dispensing system of claim 18, wherein the elevated wall includes a surface having a concave shape that forms a depression.

20. The dispensing system of claim 18, wherein the outer circumferential side wall defines a second coupling that attaches to a first coupling located on the valve cap.

* * * * *